(12) United States Patent
Houston et al.

(10) Patent No.: US 9,614,380 B2
(45) Date of Patent: Apr. 4, 2017

(54) HYSTERETIC CURRENT MODE BUCK-BOOST CONTROL ARCHITECTURE

(71) Applicant: INTERSIL AMERICAS LLC, Milpitas, CA (US)

(72) Inventors: M. Jason Houston, Cary, NC (US); Eric M. Solie, Durham, NC (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 1 day.

(21) Appl. No.: 14/872,349

(22) Filed: Oct. 1, 2015

(65) Prior Publication Data

US 2016/0105110 A1 Apr. 14, 2016

Related U.S. Application Data

(60) Provisional application No. 62/062,463, filed on Oct. 10, 2014.

(51) Int. Cl.
| | | |
|---|---|---|
| *H02M 3/158* | (2006.01) | |
| *H02M 1/00* | (2006.01) | |
| *H02J 7/00* | (2006.01) | |

(52) U.S. Cl.
CPC ............. *H02J 7/00* (2013.01); *H02M 3/1582* (2013.01); *H02M 2001/0083* (2013.01)

(58) Field of Classification Search
CPC ........... H02M 1/14; H02M 2001/0083; H02M 2003/1552
USPC ........ 323/234, 247, 259, 271, 318, 328, 344
See application file for complete search history.

(56) References Cited

U.S. PATENT DOCUMENTS

| | | | | | |
|---|---|---|---|---|---|
| 5,734,258 | A | * | 3/1998 | Esser .................. | H02M 3/1582 323/224 |
| 6,066,943 | A | * | 5/2000 | Hastings ............... | H02M 3/156 323/285 |
| 6,215,286 | B1 | * | 4/2001 | Scoones ................ | H02M 3/156 323/222 |
| 7,518,346 | B2 | * | 4/2009 | Prexl .................. | H02M 3/1582 323/222 |

(Continued)

FOREIGN PATENT DOCUMENTS

EP 2779398 A1 9/2014

*Primary Examiner* — Jessica Han
*Assistant Examiner* — David A. Singh
(74) *Attorney, Agent, or Firm* — Foley & Lardner LLP; Mark J. Danielson

(57) ABSTRACT

A hysteretic current mode buck-boost voltage regulator including a buck-boost voltage converter, a switching controller, a window circuit, a ramp circuit, and a timing circuit. The timing circuit may be additional ramp circuits. The voltage converter is toggled between first and second switching states during a boost mode, is toggled between third and fourth switching states during a buck mode, and is sequentially cycled through each switching state during a buck-boost mode. The ramp circuit develops a ramp voltage that simulates current through the voltage converter, and switching is determined using the ramp voltage compared with window voltages provided by the window circuit. The window voltages establish frequency, and may be adjusted based on the input and output voltages. The timing circuit provides timing indications during the buck-boost mode to ensure that the second and fourth switching states have approximately the same duration to provide symmetry of the ramp signal.

30 Claims, 7 Drawing Sheets

(56) References Cited

U.S. PATENT DOCUMENTS

| | | | |
|---|---|---|---|
| 7,843,177 B2 | 11/2010 | Ho et al. | |
| 8,018,212 B1 | 9/2011 | Petricek | |
| 8,085,005 B2 * | 12/2011 | Dearn | H02M 3/1582 323/222 |
| 8,305,055 B2 | 11/2012 | Wu et al. | |
| 8,330,435 B2 | 12/2012 | Qiu et al. | |
| 2008/0169796 A1 * | 7/2008 | Buethker | H02M 3/1582 323/282 |
| 2010/0085028 A1 * | 4/2010 | Moussaoui | H02M 3/1582 323/284 |
| 2011/0089915 A1 * | 4/2011 | Qiu | H02M 3/156 323/271 |
| 2012/0001610 A1 * | 1/2012 | Klein | H02M 3/1582 323/284 |
| 2012/0229110 A1 | 9/2012 | Huang et al. | |
| 2013/0070796 A1 * | 3/2013 | Belloni | H05B 33/0815 372/38.01 |
| 2013/0293204 A1 * | 11/2013 | Lu | H02M 3/1582 323/234 |
| 2014/0217996 A1 * | 8/2014 | Peker | H02M 3/1582 323/271 |

* cited by examiner

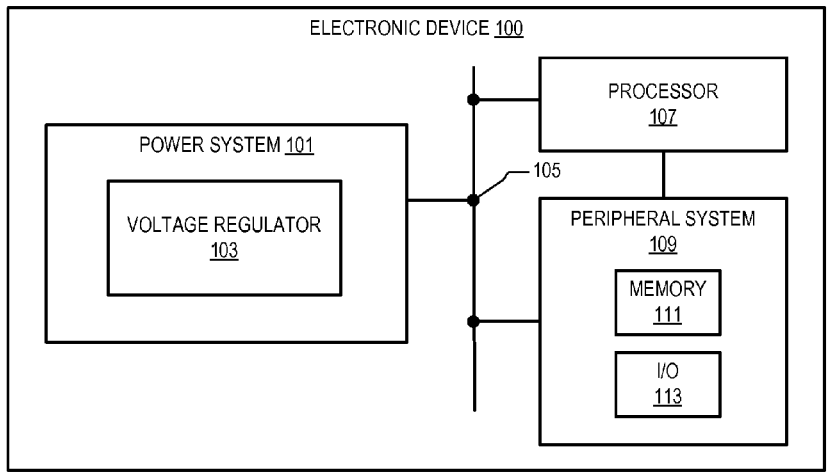
*FIG. 1*
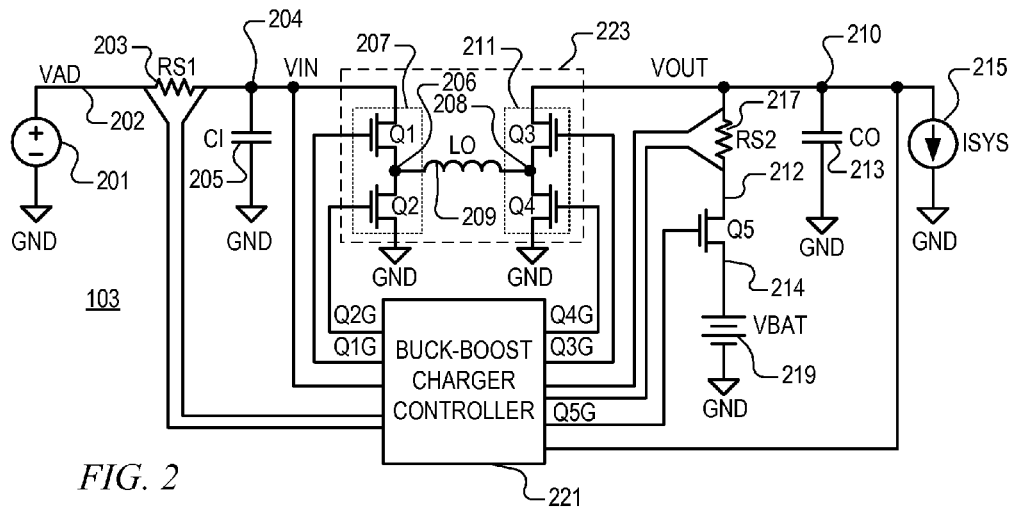
*FIG. 2*
| SWITCHING STATE | Q1 | Q2 | Q3 | Q4 | INDUCTOR VOLTAGE |
|---|---|---|---|---|---|
| S0 (BOOST ON) | ON | OFF | ON | OFF | VIN |
| S1 (BOOST OFF) | ON | OFF | OFF | ON | VIN - VOUT |
| S2 (BUCK OFF) | OFF | ON | OFF | ON | -VOUT |
| S3 (BUCK ON) | ON | OFF | OFF | ON | VIN - VOUT |
*FIG. 3*

US 9,614,380 B2

1

HYSTERETIC CURRENT MODE BUCK-BOOST CONTROL ARCHITECTURE

CROSS-REFERENCE TO RELATED APPLICATIONS

This application claims the benefit of U.S. Provisional Application Ser. No. 62/062,463, filed on Oct. 10, 2014, which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which:

FIG. 1 is a simplified block diagram of an electronic device configured with a power system including a voltage regulator implemented according to an embodiment of the present invention;

FIG. 2 is a simplified schematic and block diagram of the voltage regulator of FIG. 1 according to one embodiment of the present invention;

FIG. 3 is a tabular diagram illustrating multiple operating or regulation modes and the corresponding switching states S0-S3 of the buck-boost charger controller of FIG. 2 for controlling operation of the voltage regulator of FIG. 1 in either buck or boost regulation mode and for regulating or otherwise maintaining a voltage level of the output voltage according to one embodiment of the present invention;

DETAILED DESCRIPTION

Figure 4:
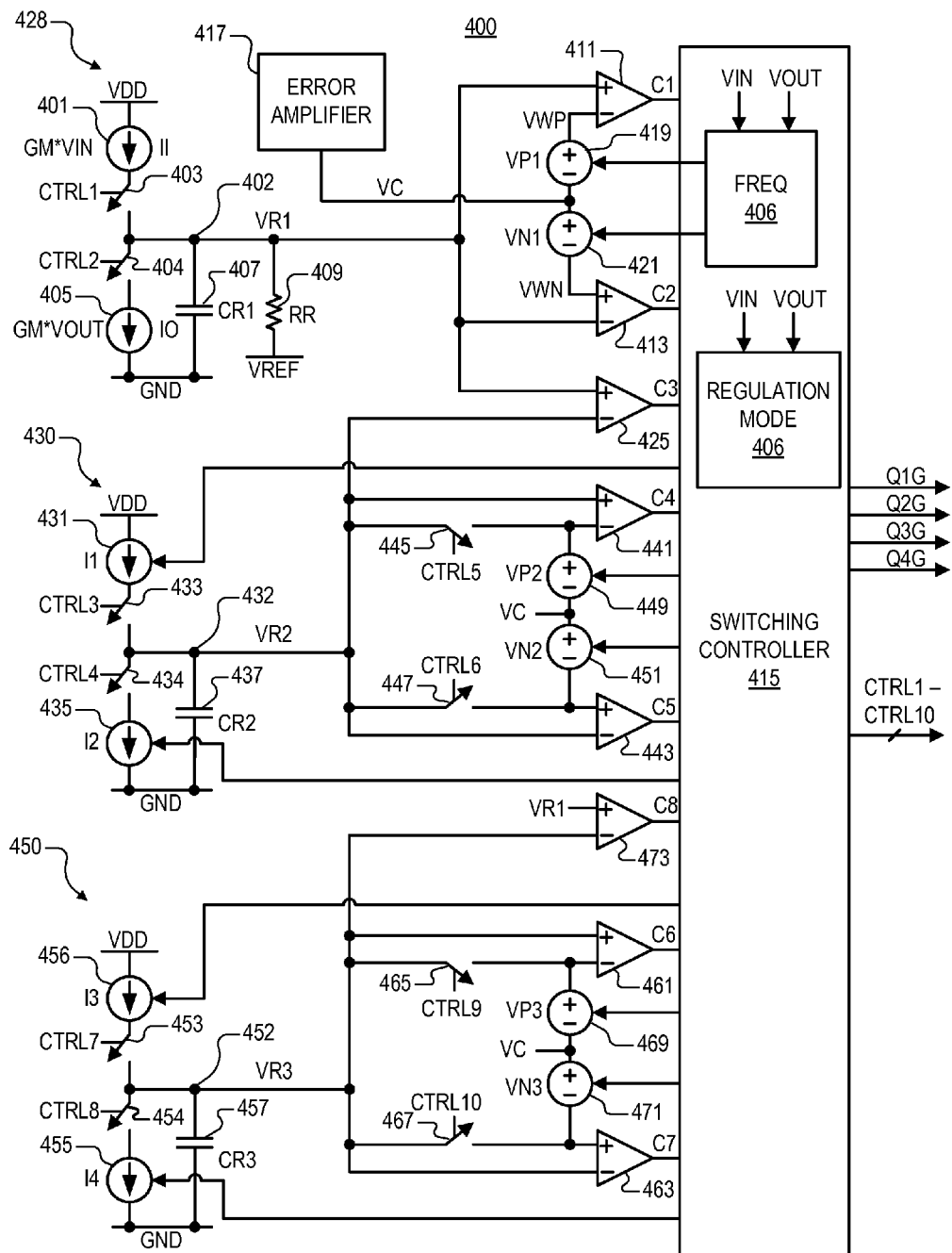
FIG. 4 is a simplified schematic diagram of a current mode control modulator according to one embodiment of the present invention that may be incorporated within the buck-boost charger controller of FIG. 2.

Voltage regulators that convert an input voltage to a regulated output voltage operate in buck mode when the input voltage is greater than the output voltage, and operate in boost mode when the input voltage is less than the output voltage. When the input voltage ranges from less than to greater than the output voltage, the voltage regulator must support both modes and must switch between the modes. Also, a buck-boost mode may be supported when the input and output voltages are sufficiently close to each other. Conventional voltage regulators have significant mode transition regulation problems between buck and boost modes. Traditional methods used fixed clock systems and added patches to help smooth the mode transitions which often added complexity and which can sacrifice system speed, linearity, and transient response. Hysteretic current mode control architectures provide the fastest transient response in buck and boost modes and do not require slope compensation, but also have significant regulation challenges near the buck-boost boundary, that is, when the input and output voltages are near to each other.

A hysteretic current mode buck-boost control architecture as described herein improves mode transitions between buck, buck-boost, and boost regulation modes, and further improves load transient response.

FIG. 1 is a simplified block diagram of an electronic device 100 configured with a power system 101 including a voltage regulator 103 implemented according to an embodiment of the present invention. The power system 101 develops one or more supply voltages which provide power to other system devices of the electronic device 100. In the illustrated embodiment, the electronic device 100 includes a processor 107 and a peripheral system 109, both coupled to receive supply voltages from the power system 101 via a supply bus 105, which includes any combination of power and/or signal conductors. In the illustrated embodiment, the peripheral system 109 may include any combination of a system memory 111, such as any combination of random-access memory (RAM) and/or read-only memory (ROM) type devices and memory controllers and the like, and an input/output (I/O) system 113, which may include system and peripheral controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

The electronic device 100 may be any type of computer or computing device, such as a computer system (e.g., notebook computer, desktop computer, netbook computer, etc.), a media tablet device (e.g., iPad by Apple Inc., Kindle by Amazon.com, Inc., etc.), a communication device (e.g., cellular phone, smartphone, etc.), among other types of electronic devices (e.g., media player, recording device, etc.). The electronic device 100 may operate with a battery, which may or not be removable and which may or may not be rechargeable. In many such configurations, the battery is rechargeable (e.g., rechargeable battery 219, FIG. 2) and a separate alternating current (AC) adapter is provided (e.g., adapter 201, FIG. 2) to provide power to the electronic device 100 and/or recharge the battery.

FIG. 2 is a simplified schematic and block diagram of the voltage regulator 103 according to one embodiment of the present invention. An adapter 201 is coupled between and adapter node 202 and a reference node (shown as ground or GND), so that the adapter node 202 develops an adapter voltage VAD when connected to the electronic device 100. A sense resistor 203 with resistance RS1 is coupled between node 202 and an input node 204 developing an input voltage VIN. An input capacitor 205 with capacitance CI is coupled between the input node 204 and GND. A buck switching stage 207 is coupled between the input node 204 and GND. The buck switching stage 207 includes a first transistor Q1 having current terminals coupled between the input node 204 and a first intermediate node 206, and a second transistor Q2 having current terminals coupled between node 206 and GND. An output inductor 209 with inductance LO is coupled between the first intermediate node 206 and a second intermediate node 208. A boost switching stage 211 is coupled between an output node 210 developing an output voltage VOUT and GND. The boost switching stage 211 includes a first transistor Q4 having current terminals coupled between the output node 210 and the second intermediate node 208, and a second transistor Q3 having current terminals coupled between node 208 and GND. The buck and boost switching stages 207 and 211 collectively form a buck-boost switching stage.

An output capacitor 213 with capacitance CO and a system load 215 drawing system current ISYS (or load current) are both coupled between the output node 210 and GND. The system load 215 represents any combination of the system devices drawing load current, such as the processor 107, the system memory 111, the peripheral system 109, etc. A second current sense resistor 217 with resistance RS2 is coupled between the output node 210 and a node 212, which is coupled to one current terminal of a transistor Q5. The other current terminal of Q5 is coupled to a battery terminal 214 developing a battery voltage VBAT, which is further coupled to a positive terminal of a rechargeable battery 219. The rechargeable battery 219 has a negative terminal coupled to GND. A buck-boost charger controller 221 is provided for controlling operation as further described herein.

The transistors Q1-Q5 are each shown as MOS or FET type transistors, such as a P-type MOS (PMOS) or P-type FET (PFET) transistor, an N-type MOS (NMOS) or P-type FET (PFET) transistor, or a MOSFET transistor or the like. Alternative power switching devices or electronic control switches are contemplated, such as bipolar junction transistors (BJTs) and the like, insulated-gate bipolar transistors (IGBTs) and the like, etc. Each transistor device is sized and configured to perform the intended function.

The buck-boost charger controller 221 has inputs coupled to nodes 202 and 204 for sensing the voltage across the sense resistor 203, has another input coupled to the input node 204 for sensing the input voltage VIN, has inputs coupled to nodes 210 and 212 for sensing the voltage across the sense resistor 217, has an input coupled to the output node 210 for sensing the output voltage VOUT, and has outputs Q1G, Q2G, Q3G, Q4G and Q5G coupled to control terminals (e.g., gate terminals) of transistors Q1, Q2, Q3, Q4 and Q5, respectively. The buck-boost charger controller 221 senses adapter current (provided by the adapter 201) via the voltage across the sense resistor 203, and senses battery current (charge or discharge current) through the battery 219 via the voltage across the sense resistor 217. The buck-boost charger controller 221 controls buck and boost operation as described herein by controlling the transistors Q1-Q4 via the Q1G-Q4G signals, respectively. The buck-boost charger controller 221 controls battery charge/discharge by controlling the transistor Q5 via the Q5G signal. The buck-boost charger controller 221 is configured as a battery charge system or the like for detecting the adapter 201 and the battery 219, for charging and/or discharging the battery 219, and for controlling the source of power for providing the system current ISYS to the load.

The buck-boost charger controller 221 operates according to pulse width modulation (PWM) for controlling switching of the transistors Q1-Q4. As described further herein, however, the switching states of the system depend upon the regulation mode and the relative voltage levels of the input and output voltages. In normal buck or boost configurations, a singular PWM signal with two states may be used to control switching operation. The buck-boost charger controller 221, however, operates in four switching states for controlling switching in separate buck, boost and buck-boost regulation modes, so that PWM operation is defined using four separate switching states S0, S1, S2 and S3 as further described herein.

The voltage regulator 103 is configured as a hysteretic current mode buck-boost control system as further described herein. Although the voltage regulator 103 is configured as a battery charge system, any type of configuration or system is contemplated in which a voltage regulator is employed. The buck switching stage 207, the boost switching stage 211 (collectively, the buck-boost switching stage) and the output inductor 209 of the voltage regulator 103 collectively form a buck-boost voltage converter 223 that converts the input voltage VIN to the regulated output voltage VOUT under control of the buck-boost charger controller 221. In one embodiment, the voltage regulator 103 is configured to regulate any one of multiple parameters, such as input voltage VIN, output voltage VOUT, input current (such as detected through the adapter 201), battery current through the battery 219, etc. Although not further described, the voltage regulator 103 may be configured to switch between multiple parameters to control one parameter at a time based on operating and system conditions.

FIG. 3 is a tabular diagram illustrating multiple switching states S0-S3 of the buck-boost charger controller 221 for controlling operation of the voltage regulator 103 in each of the buck, buck-boost and boost regulation modes and for regulating or otherwise maintaining a voltage level of VOUT according to one embodiment of the present invention. The activation states of the particular transistors depends upon the switching state, and the transitions between the switching states depends upon the particular regulation mode. In the illustrated embodiment, each gate control signal QXG is pulled high to turn on a corresponding transistor QX, and pulled low to turn off the transistor, in which "X" any one of the transistors 1-4. For example, Q1G is pulled high to turn Q1 on, and pulled low to turn Q1 off.

A first switching state S0 (Boost On) occurs when Q1 and Q3 are turned on (Q1G and Q3G high) and Q2 and Q4 are turned off (Q2G and Q4G low). In state S0, one end of the output inductor 209 is coupled to VIN and the other to GND, so that the inductor voltage is VIN. A second switching state S1 (Boost Off) occurs when Q1 and Q4 are turned on and Q2 and Q3 are turned off (Q3G pulled low and Q4G pulled high). In state S1, one end of the output inductor 209 is coupled to VIN and the other end to VOUT, so that the inductor voltage is VIN−VOUT. A third switching state (Buck Off) occurs when Q2 and Q4 are turned on and Q1 and Q3 are turned off. In state S2, one end of the output inductor 209 is coupled to GND and the other end to VOUT, so that the inductor voltage is −VOUT. A fourth switching state (Buck On) occurs when transistors Q1 and Q4 are turned on and Q2 and Q3 are turned off. In state S3, one end of the output inductor 209 is coupled to VIN and the other end to VOUT, so that the inductor voltage is VIN-VOUT.

In the boost regulation mode, Q1 is on and Q2 is off, and operation is controlled by switching between Q3 and Q4. In the buck regulation mode, Q3 is off and Q4 is on, and operation is controlled by switching between Q1 and Q2. In the buck-boost regulation mode, operation switches between up to all of the switching states S0-S3 as further described herein. The switching states S0-S3 generally control the gate drive signals Q1G-Q4G for controlling the activation states of the transistors Q1-Q4, respectively.

FIG. 4 is a simplified schematic diagram of a current mode control modulator 400 according to one embodiment of the present invention. The modulator 400 includes combined control signals which may be used within the buck-boost charger controller 221 for generating the gate control signals Q1G-Q4G for controlling operation of the voltage regulator 103. The modulator 400 includes a primary ramp circuit 428 for developing a primary ramp signal VR1. The modulator 400 may further include a timing circuit that is used to ensure that the durations of TS1 and TS3 are approximately equal. In one embodiment, the timing circuit includes additional ramp circuits 430 and/or 450 as further described herein.

The ramp circuit 428 includes a current source 401 providing a current I1 is coupled between a source voltage, shown as VDD, and one switched terminal of a switch 403. The switch 403 is shown as a single-pole, single-throw (SPST) type switch having its other switched terminal coupled to a ramp node 402 developing the ramp voltage VR1. Another SPST switch 404 has one switched terminal coupled to the ramp node 402 and its other switched terminal coupled to another current source 405. The current source 405 develops a current IO and is coupled between the switch 404 and GND. The current I1 developed by the current source 401 is proportional to a transconductance gain GM multiplied by the input voltage VIN, or I1∝GM*VIN, and the current IO developed by the current source 405 is proportional to the transconductance gain GM multiplied by the output voltage VOUT, or IO∝GM*VOUT. As shown, when switch 403 is closed, the current source 401 sources current I1 to the ramp node 402, and when switch 404 is closed, the current source 405 draws or sinks current from the ramp node 402. Proportional relationships described herein are intended to mean that an additional gain factor may be incorporated, although the gain factor may be "1" or "−1". For example, the current I1 may instead be represented as IO=K*GM*VOUT.

A transconductance amplifier or the like (not shown) with transconductance gain GM may be used to implement each of the current sources 401 and 405. For example, a first transconductance amplifier receiving VIN may implement the current source 401, and another transconductance amplifier receiving VOUT may implement the current source 405. The switches 403 and 404 may be implemented in any suitable manner, such as at least one electronic switching transistor (e.g., FET or MOS transistor or the like). The switch 403 has a control input receiving a control signal CTRL1, and the switch 404 has a control input receiving another control signal CTRL2. In each case, when the control signal is asserted to a first logical state, such as being asserted high, then the switch is closed, and when asserted to a second logical state, such as being asserted low, then the switch is opened.

A ramp capacitor 407 with capacitance CR1 is coupled between the ramp node 402 and GND, and a resistor 409 with ramp resistance RR is coupled between the ramp node 402 and a reference or bias voltage VREF. The ramp node 402 is provided to the positive (or non-inverting) input of a comparator 411, to the negative (or inverting) input of a second comparator 413, and to the positive input of a third comparator 425. The comparator 411 asserts a control signal C1, the comparator 413 asserts a control signal C2, and the comparator C3 asserts a control signal C3, each provided to a switching controller 415.

An error amplifier 417 generally amplifies the difference between a controlled parameter of the voltage regulator 103 and a target or reference voltage and develops a compensation or control voltage VC. In one embodiment, for example, the output voltage VOUT, or a sensed version thereof, along with an output reference voltage (not shown) are provided to the error amplifier 417 for developing VC. Additional loop compensation circuitry (not shown) may be provided.

The control voltage VC is provided to a negative terminal of a voltage source 419 developing an upper voltage VP1, having its positive terminal developing a positive window voltage VWP provided to the negative input of the comparator 411. VC is also provided to a positive terminal of another voltage source 421 developing a lower voltage VN1, having its negative terminal developing a negative window voltage VWN provided to the positive input of the comparator 413. The control voltage VC varies based on operating conditions in order to control the regulated parameter. Regardless of changes of VC, the voltage VWP remains above VC by the upper voltage VP1 and the voltage VWN remains below VC by the lower voltage VN1. In other words, VWP and VWN both follow VC at the respective offset voltages above and below VC. The difference between VWP and VWN is a window voltage VWIN, or VWIN=VWP−VWN.

The switching controller 415 receives the control signals C1, C2 and C3, along with other control signals C4, C5, C6, C7 and C8, described further below, controls the control signals CTRL1-CTRL10, and determines the switching states S0-S3 of the voltage regulator 103. The switching controller 415 generates the gate drive signals Q1G-Q4G based on the determined switching state to turn on and off the transistors Q1-Q4 as shown in FIG. 3. In an alternative embodiment, the switching controller 415 may provide switching state signals (not shown) to a separate drive controller (not shown) which converts the indicated switching states to the gate drive signals Q1G-Q4G for controlling operation of the transistors Q1-Q4.

In one embodiment, the ramp circuit 428 of the modulator 400 operates according to a synthetic ripple configuration, in which the ramp voltage VR1 replicates or synthetically simulates the ripple current through the output inductor 209. In the buck regulation mode of operation, operation toggles between states S2 and S3 in which Q3G is low to keep Q3 off, Q4G is high to keep Q4 on, and Q1G and Q2G are each toggled to opposite states with respect to each other to toggle activation of Q1 and Q2. In this manner, the output end of the output inductor 209 remains coupled to VOUT, and the input end is switched between the input voltage VIN and GND, CTRL2 remains asserted to keep switch 404 closed, and CTRL1 is toggled high and low to control switching operation by turning switch 403 on and off.

When CTRL1 is high, the switch 403 is closed in which the current source 401 charges the capacitor 407 with a current proportional to the input voltage while the current source 405 discharges the capacitor 407 with a current proportional to the output voltage. In the buck mode since VIN>VOUT, the ramp voltage VR1 ramps up replicating the current through the output inductor 209 proportional to VIN−VOUT consistent with the switching state S2. When CTRL1 is low, the switch 403 is opened in which only the current source 405 discharges the capacitor 407 with a current proportional to the output voltage. In this case, the ramp voltage VR1 ramps down replicating the current through the output inductor 209 when its voltage is VOUT (or −VOUT since VR1 ramps down as the ramp capacitor CR1 discharges) consistent with the switching state S3.

In the boost regulation mode of operation, operation toggles between states S0 and S1 in which Q2G is low to keep Q2 off, Q1G is high to keep Q1 on, and Q3G and Q4G are each toggled to opposite states with respect to each other to toggle activation of Q3 and Q4. In this manner, the input end of the output inductor 209 remains coupled to VIN, and the output end is switched between the output voltage VOUT and GND, CTRL1 remains asserted to keep switch 403 closed, and CTRL2 is toggled high and low to control switching operation by turning switch 404 on and off.

When CTRL2 is low in the boost mode, the switch 404 is opened in which the current source 401 charges the capacitor 407 with a current proportional to the input voltage VIN. The ramp voltage VR1 ramps up replicating the current through the output inductor 209 when its voltage is VIN since VR1 ramps up as the ramp capacitor CR1 charges consistent with the switching state S0. When CTRL2 is high, the switch 404 is closed in which the current source 401 continues to charge the capacitor 407 with a current proportional to the input voltage while the current source 405 discharges the capacitor 407 with a current proportional to the output voltage. In the boost mode since VOUT>VIN, the ramp voltage VR1 ramps down replicating the current through the output inductor 209 proportional to VIN−VOUT consistent with the switching state S1. In the boost regulation mode, VR1 ramps up and down between the voltages VWP and VWN.

The voltage sources 419 and 421 and the comparators 411 and 413 form a hysteretic comparator. During both the buck and boost regulation modes, the switching controller 415 monitors the control signals C1 and C2 and asserts the control signals CTRL1 and CTRL2 and the gate drive signals Q1G-Q4G accordingly in which VR1 ramps up and down within the window voltage VWIN between VWP and VWN. As further described herein, a buck-boost regulation mode is defined in addition to the buck and boost regulation modes, and facilitates transitioning from buck to boost or from boost to buck as the voltage level of VIN varies relative to VOUT. Additional circuitry is used to implement the buck-boost regulation mode. Also, VR1 is configured to ramp outside the nominal voltage window VWIN as further described herein.

In any of the regulation modes, the voltage regulator 103 employs hysteretic current mode control in which the switching frequency is variable and changes based on load conditions. Although the actual switching frequency FSW is allowed to vary in response to load conditions, the switching frequency may be controlled towards a target steady state frequency level FSS. In one embodiment, the steady state frequency level FSS is 1 Megahertz (MHz), although any suitable switching frequency is contemplated. The switching frequency FSW may be controlled based on any one of several different methods. In one embodiment as further described herein, FSS is determined and maintained in an open loop method based on the voltage levels of VIN and VOUT. In another embodiment, FSW is measured, such as by measuring the frequency of the operative switching signals in any given regulation mode (using timers or counters or the like), and the measured frequency is compared with the target frequency FSS and operation is adjusted accordingly.

The switching frequency may be adjusted based on any suitable method. In one embodiment, the upper and lower voltages VWP and VWN are both adjusted so that VWIN is adjusted to adjust the switching frequency FSW back towards the target steady state frequency level FSS. For example, to increase frequency, VWP and VWN may both be temporarily reduced by the same amount, and to decrease frequency, VWP and VWN may both be temporarily increased by the same amount. In this manner, the actual switching frequency FSW may change temporarily to quickly respond to load transients, but settles quickly back to the steady state switching frequency FSS when the load condition is stable.

In one embodiment, a frequency controller 406 is provided, such as within the switching controller 415, that controls the voltage sources 419 and 421 to adjust the voltages VWP and VWN to adjust the window voltage based on the voltage levels of VIN and VOUT to maintain the steady state frequency FSS. In the buck regulation mode, VWIN∝PER*(VIN−VOUT)*VOUT/VIN, where "PER" is the target period of FSS. For example, if FSS=1 MHz, PER=1 microsecond (μs). In the boost regulation mode, VWIN∝PER*(VOUT−VIN)*VIN/VOUT. In the buck-boost regulation mode when VIN>VOUT, VWIN∝PER*VIN*VOUT/(3*VIN+VOUT). In the buck-boost regulation mode when VOUT>VIN, VWIN∝PER*VIN*VOUT/(3*VOUT+VIN). In each expression, a gain factor "K" may be used to replace proportionality with equality, in which "K" may include 1 or −1. The switching controller 415 may further ensure a minimum period for each of the switching states. In one embodiment, a timer may be provided that is initiated for each switching state transition and prevents the next transition from occurring until the timer times out indicating the minimum switching period time. In another embodiment, the frequency controller 406 simply prevents the voltages VP1 and VN1 from falling below a predetermined minimum level indicative of the minimum switching period time.

The modulator 400 includes a timing circuit for meeting timing conditions as further described herein. In the illustrated embodiment, the timing circuit comprises at least one additional ramp circuit, shown as the ramp circuit 430, for developing a second ramp signal VR2. As further described herein, VR2 may be used as a timing ramp signal for controlling the duration of one or both switching states S1 and S3 during the buck-boost regulation mode. The ramp circuit 430 is configured in a similar manner as the primary ramp circuit 428. A current source 431 providing a current I1 is coupled between VDD and one switched terminal of a SPST switch 433 having a control input receiving a control signal CTRL3. The other switched terminal of the switch 433 is coupled to a ramp node 432 developing the ramp voltage VR2. Another SPST switch 434 has one switched terminal coupled to the ramp node 432 and its other switched terminal coupled to another current source 435 developing a current I2 to GND. The magnitudes of the currents I1 and I2 are configured according to the particular embodiment as further described herein. Again, transconductance amplifiers may be used to implement the current sources 433 and 435 and transistors or the like may be used to implement the switches.

A ramp capacitor 437 with capacitance CR2 is coupled between the ramp node 432 and GND. The ramp node 432 is provided to the positive input of a comparator 441, to the negative input of another comparator 443, and to the negative input of the comparator 425. The comparator 441 asserts a control signal C4 and the comparator 443 asserts a control signal C5, both provided to the switching controller 415. The control voltage VC is provided to a negative terminal of a voltage source 449 developing an offset voltage VP2, having its positive terminal developing a positive window voltage provided to the negative input of the comparator 441. VC is also provided to a positive terminal of another voltage source 451 developing an offset voltage VN2, having its negative terminal developing a negative window voltage provided to the positive input of the comparator 443. The magnitudes of the voltages VP2 and VN2 are configured according to the particular embodiment as further described herein. A SPST switch 445 has its switched terminals coupled between the ramp node 432 and the negative input of the comparator 441, and has a control input receiving a control signal CTRL5. Another SPST switch 447 has its switched terminals coupled between the ramp node 432 and the positive input of the comparator 443, and has a control input receiving a control signal CTRL6. The switching controller 415 receives C4 and C5 and generates the control signals CTRL3-CTRL6.

The comparator 425 is provided in certain embodiments to compare the ramp voltages VR1 and VR2 to develops the control signal C3 provided to the switching controller 415.

The ramp circuit 450, if provided, is configured in similar the same manner as the ramp circuit 430 for developing a third ramp voltage VR3 in certain embodiments as described herein. As further described herein, VR3 may be used as a timing ramp signal for controlling the duration of one or both switching states S1 and S3 during the buck-boost regulation mode. In some configurations in which only one additional ramp control signal is used, the ramp circuit 450 is not provided. A current source 456 providing a current I3 is coupled between VDD and one switched terminal of a SPST switch 453 having a control input receiving a control signal CTRL7. The other switched terminal of the switch 453 is coupled to a ramp node 452 developing the ramp voltage VR3. Another SPST switch 454 has one switched terminal coupled to the ramp node 452 and its other switched terminal coupled to another current source 455 developing a current I4 to GND. The magnitudes of the currents I3 and I4 are configured according to the particular embodiment as further described herein. Again, transconductance amplifiers may be used to implement the current sources 456 and 455 and transistors or the like may be used to implement the switches.

A ramp capacitor 457 with capacitance CR3 is coupled between the ramp node 452 and GND. The ramp node 452 is provided to the positive input of a comparator 461 and to the negative input of another comparator 463. The comparator 461 asserts a control signal C6 and the comparator 463 asserts a control signal C7, both provided to the switching controller 415. The control voltage VC is provided to a negative terminal of a voltage source 469 developing an offset voltage VP3, having its positive terminal developing a positive window voltage provided to the negative input of the comparator 461. VC is also provided to a positive terminal of another voltage source 471 developing an offset voltage VN3, having its negative terminal developing a negative window voltage provided to the positive input of the comparator 463. The magnitudes of the voltages VP3 and VN3 are configured according to the particular embodiment as further described herein. A SPST switch 465 has its switched terminals coupled between the ramp node 452 and the negative input of the comparator 461, and has a control input receiving a control signal CTRL9. Another SPST switch 467 has its switched terminals coupled between the ramp node 452 and the positive input of the comparator 463, and has a control input receiving a control signal CTRL10. The switching controller 415 receives C6 and C7 and generates the control signals CTRL7-CTRL10.

Another comparator 473 receives VR1 at its positive input (e.g., coupled to ramp node 402 or a buffered version thereof), VR3 at its negative input (e.g., coupled to ramp node 452 or a buffered version thereof), and asserts a control signal C8 to the switching controller 415. The comparator 473 may be provided to develop a control signal C8 in certain embodiments when it is desired to determine when the voltages of VR1 and VR3 cross each other.

Any one or more of the voltage sources 419, 421, 449, 451, 469 and 471 may be configured with a fixed voltage or an adjustable voltage. As shown, each of these voltage sources 419, 421, 449, 451, 469 and 471 includes a control input receiving a corresponding control signal from the switching controller 415. In this manner, the switching controller 415 asserts or adjusts a control signal to set or adjust the voltage level of the corresponding voltage source. As previously described, the VP1 and VN1 voltages developed by the voltage sources 419 and 421, respectively, may be adjusted during operation by the frequency controller 406 to control steady state frequency. Also, the VP1 and VN1 voltages may be adjusted by an offset from nominal levels as further described herein. Also, any one or more of the current sources 431, 435, 456 and 455 may be configured with a fixed current or an adjustable current. As shown, each of these current sources 431, 435, 456 and 455 includes a control input receiving a corresponding control signal from the switching controller 415. In this manner, the switching controller 415 asserts or adjusts a control signal to set or adjust the current level of the corresponding current source. Alternatively, any one or more of these voltage sources and current sources may be configured as a fixed source depending upon the particular embodiment or configuration.

It is noted that each of the comparators 411, 413, 425, 441, 443, 461, 463 and 473 are provided to detect when the voltage levels between two voltages cross each other, or when one voltage "reaches" the voltage of another, and to provide the corresponding control signals C1-C8 indicative thereof. For example, when the ramp voltage VR1 is below the voltage level of VWP yet ramping up towards VWP, the control signal C1 is initially asserted low by the comparator 411. When VR1 "reaches" VWP, the comparator 411 switches state and asserts C1 high indicating to the switching controller 415 that VR1 has reached the level of VWP so that the switching controller 415 makes a corresponding switching decision. As generally understood herein, however, each of the comparators are implemented using physical comparators with offset voltages with hysteresis and the like, so that each comparator switches when one voltage has risen above or fallen below the other voltage by a small offset or threshold voltage. For example, the comparator 411 asserts C1 only when VR1>VWP, the comparator 413 asserts C2 high only when VR1<VWN, and so on.

In one embodiment, regulation mode controller 408 is provided, such as within the switching controller 415, that makes decisions concerning the regulation mode based on the relative voltage levels of VIN and VOUT. The mode decision may be based on at least one boundary condition such as when the voltage level VIN is within a predetermined range of VOUT. In one embodiment, when VIN/VOUT>1.2, then the buck regulation mode is indicated, when VIN/VOUT<0.8, then the boost regulation mode is indicated, and otherwise the buck-boost regulation mode is indicated. Different ratios of VIN versus VOUT may be used.

Figure 5:
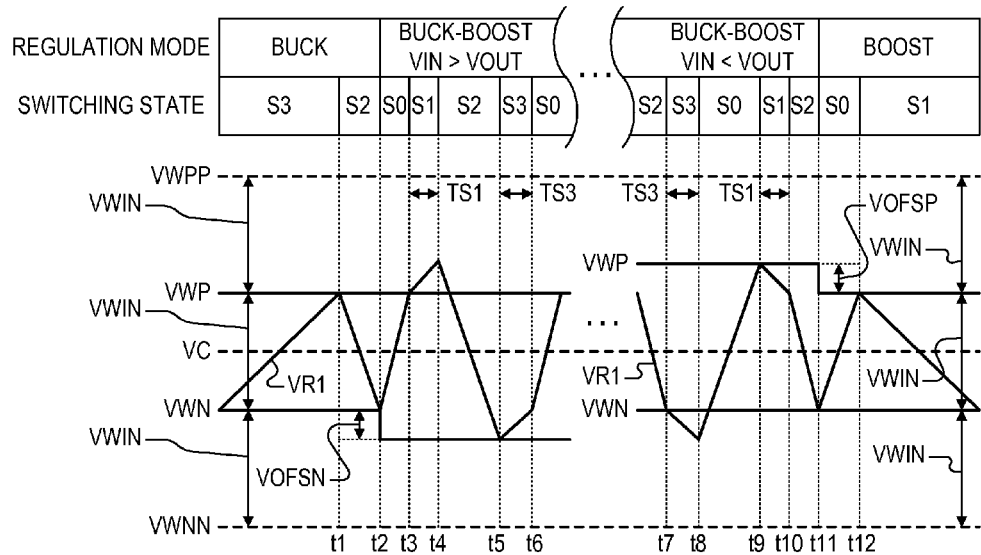
FIG. 5 is a timing diagram illustrating a desired waveform for a ramp voltage VR1 according to one embodiment of the present invention.

FIG. 5 is a timing diagram illustrating a desired waveform for VR1 according to one embodiment of the present invention. A chart aligned above the timing diagram shows the regulation mode (upper half of chart) and the corresponding switching states (lower half of chart) and switching state transitions. VR1 is plotted relative to the control voltage VC, which is plotted as a dashed line in the center of timing diagram. It is understood that VC varies during normal operation depending upon operating conditions. For purposes of clarity, VC is shown as a steady or non-varying signal for purposes of more clearly illustrating operation of VR1. VWP and VWN are shown plotted above and below VC separated by the window voltage VWIN. Also, upper and lower out window voltages are plotted as dashed lines, in which VWPP is above the nominal level of VWP by VWIN, and VWNN is below the nominal level of VWN by VWIN. VWPP and VWNN are used in some embodiments. In other embodiments, either one or both of VWPP and VWNN are now used.

Operation is initially in the buck regulation mode in which operation transitions between the S2 and S3 switching states as previously described. During state S3, VR1 ramps up until a time t1 when it reaches VWP, or VR1>VWP, at which time operation transitions to state S2 so that VR1 ramps down. During state S2, VR1 ramps down until a time t2 when it reaches VWP, or VR1<VWN, at which time operation normally transitions back to state S3 during the buck regulation mode. Operation may continue in this manner so long as the condition for buck mode remains true.

When the decision is made to switch to the buck-boost regulation mode, then at time t2, when VR1 falls to VWN, (or VR1<VWN) operation instead transitions to the buck-boost regulation mode in which VIN is closer to, yet still greater than, VOUT. The decision to transition to the buck-boost regulation mode is based on a separate logic determination, such as made by the regulation mode controller 408 based on the relative voltage levels of VIN and VOUT.

In the buck-boost regulation mode beginning at time t2, operation transitions to the S0 switching state instead of S3. As previously described in FIG. 3, during the switching state S0 the transistors Q1 and Q3 are turned on while Q2 and Q4 are turned off so that the output inductor 209 is coupled between VIN and GND. In state S0 during the buck-boost regulation mode, VR1 ramps up towards VWP at a rate proportional to VIN. When VR1>VWP during state S0 of the buck-boost regulation mode at time t3, operation transitions to the switching state S1. During the switching state S1 the transistors Q1 and Q4 are on while Q2 and Q3 are off so that the output inductor 209 is coupled between VIN and VOUT. At this point, however, VIN is still greater than VOUT in the buck-boost regulation mode, so that even though this is a discharge state when in the boost regulation mode, VR1 instead continues to rise to above the nominal level of VWP.

When VR1 meets a timing condition during the switching state S1 as further described herein at time t4, operation transitions to the switching state S2 (Buck Off) in which Q2 and Q4 are on while Q1 and Q3 are off. The voltage across the output inductor 209 reverses (to −VOUT) so that VR1 decreases back towards VWN until VR1 drops below VWN, or VR1<VWN. During the buck-boost regulation mode while VIN>VOUT, VWN is adjusted according to an offset from its nominal level as further described herein. When VR1<VWN (adjusted) at time t5, operation transitions to the switching state S3 (Buck On) in which Q1 and Q4 are on while Q2 and Q3 are off, and VR1 rises again. When VR1 meets another timing condition during the switching state S3 as further described herein at time t6, operation transitions to the switching state S0 and VR1 continues to increase at a greater rate as previously described between times t2 and t3. During the buck-boost regulation mode, operation repeatedly and sequentially transitions through the switching states S0-S3, or S0, S1, S2, S3, S0, S1, S2, S3, S0, . . . , and so on. The minimum off time during state S2 is also controlled by adjustment of the modulator window voltage VWIN, which may be effectuated by adjusting the voltages of VP1 and VN1 accordingly.

During the buck-boost regulation mode, if the voltage level of VIN falls below the voltage level of VOUT (or VIN<VOUT), the buck-boost regulation mode continues in a substantially similar manner so long as the condition for the buck or boost regulation modes remains false. In this case, VWN remains at its nominal level whereas VWP is adjusted by an offset as described further herein. During state S2 (Buck Off) in the buck-boost regulation mode, Q2 and Q4 are on while Q1 and Q3 are off so that VR1 ramps down at a rate proportional to VOUT until it reaches VWN at time t7, or VR1<VWN. At time t7, the switching state transitions to S3 (Buck On) in which Q1 and Q4 are on while Q2 and Q3 are off. Normally during the buck regulation mode when transitioning from state S2 to S3, VR1 rises since VIN is greater than VOUT. In the buck-boost regulation mode when VIN<VOUT, however, VR1 continues to ramp down instead.

When VR1 meets the timing condition during the switching state S3 at time t8, operation transitions to switching state S0 (Boost On) in which Q1 and Q3 are turned on while Q2 and Q4 are off so that VR1 ramps up towards VWP. When VR1>VWP (adjusted) at time t9, operation transitions to switching state S1 (Boost Off) in which Q1 and Q4 are on while Q2 and Q3 are off so that VR1 ramps down at a rate based on a difference between VIN and VOUT. When VR1 meets the timing condition during the switching state S1 at time t10, operation transitions to switching state S2 (Buck Off) in which Q2 and Q4 are on and Q1 and Q3 are off so that VR1 ramps down at a higher rate since proportional to VOUT alone. When VR1<VWN at time t11, operation during the buck-boost regulation mode would transition back to the switching state S3 as shown at time t7. In this case, however, operation transitions to the boost regulation mode since a decision to enter the boost regulation mode has been made.

The decision to transition between the boost regulation mode and the buck-boost regulation mode is based on a separate logic determination, such as made by the regulation mode controller 408 based on the relative voltage levels of VIN and VOUT. At time t11 when the threshold condition is met for boost regulation mode, operation transitions to the switching state S0 (Boost On) rather than to switching state S3. In this case, VR1 rises at a rate based on VIN until VR1>VWP at time t12, at which time operation transitions to the switching state S1. In the boost regulation mode, operation switches between switching states S0 and S1 according to normal boost regulation mode as previously described. If the voltage level of VIN subsequently rises relative to VOUT crossing the boundary condition in the opposite direction, then operation transitions back to the buck-boost regulation mode. Operation transitions back into the buck regulation mode if and when the boundary condition for the buck regulation mode is indicated.

During the buck-boost regulation mode, it is desired to maintain hysteretic current mode performance while maintaining steady state frequency at a target level. As previously noted, VWIN may be adjusted in an attempt to maintain the steady state frequency level at a target frequency level. Also, operation repeatedly transitions between states S0 to S3 to maintain predictable steady state frequency. Furthermore, it is desired to maintain symmetry of the VR1 signal relative to the control signal VC. In order to maintain such symmetry of the VR1 signal, the switching controller 415 enforces the time duration during the switching state S1, or TS1 (from time t3 to t4 and from time t9 to t10), to be approximately equal to the time duration during the switching state S3, or TS3 (from time t5 to t6 and from time t7 to t8), such that TS1≈TS3. As described further herein, various methods may be used to determine the upper and lower switching thresholds to meet the timing conditions noted above during switching states S1 and S3 during the buck-boost regulation mode to ensure that TS1≈TS3 to control switching frequency.

As shown in FIG. 5, the switching sequence S0 to S3 repeats during the buck-boost regulation mode. The durations of the states S1 and S3 are controlled so that TS1≈TS3 as further described below. The steady state switching frequency is controlled by controlling the window voltage VWIN, or any other method of controlling the collective duration of states S0 to S3, or TS0+TS1+TS2+TS3 to be approximately equal to a target duration TSW. Offset voltages may be determined to adjust VWP and VWN as further described herein for providing the upper and lower switching thresholds. The control logic for determining each of the switching rules as described herein may be implemented in a digital or analog domain or a combination of both.

The "nominal" levels of VWP and VWN, or $VWP_{NOM}$ and $VWN_{NOM}$, is defined as the voltage levels that VWP and VWN would normally have during the buck and boost regulation modes including any adjustments for frequency to adjust FSW back to FSS. The upper switching threshold level may be determined by adding an offset VOFSP to $VWP_{NOM}$, in which VOFSP is determined according to the following equation (1):

$$VOFSP = \frac{VOUT - VIN}{VOUT}(VWP_{NOM} - VWN_{NOM}) \quad (1)$$

The lower switching threshold level may be determined by subtracting an offset VOFSN from $VWN_{NOM}$, in which VOFSN is determined according to the following equation (2):

$$VOFSN = \frac{VIN - VOUT}{VIN}(VWP_{NOM} - VWN_{NOM}) \quad (2)$$

It is noted that VOFSN is subtracted from the nominal level of VWN during the buck-boost mode only while VIN>VOUT. When VIN=VOUT, VOFSN goes to zero so that VWN is not adjusted. When VIN<VOUT, the offset voltage VOFSN goes negative which might otherwise increase the nominal voltage level of VWN, but instead is not subtracted from VWN. In this manner, VWN is only adjusted downwards while VIN>VOUT.

In a similar manner, VOFSP is added to the nominal level of VWP during the buck-boost mode while VIN<VOUT. When VIN=VOUT, VOFSP goes to zero so that VWP is not adjusted. When VIN>VOUT, the offset voltage VOFSP goes negative which might otherwise decrease the nominal voltage level of VWP, but instead is not added to VWP. In this manner, VWP is only adjusted upwards while VIN<VOUT.

Although not explicitly shown, between the times t6 and t7, the voltage of VIN decreases relative to the voltage of VOUT. While VIN>VOUT, the offset voltage VOFSP stays at $VWP_{NOM}$. The offset voltage VOFSN decreases until it goes to zero when VIN=VOUT, so that VWN stays at $VWN_{NOM}$ as VIN decreases below VOUT. As VIN decreases below VOUT, VOFSP increases so that VWP increases above $VWP_{NOM}$. Operation is the same for each of the following configurations unless stated otherwise.

In addition, the upper outer window voltage VWPP is determined by adding VWIN to the nominal level of VWP, and the lower outer window voltage VWNN is determined by subtracting VWIN from the nominal level of VWN. These additional window offsets and voltage levels may or may not be used in each of various embodiments as further described herein.

The control system provides very smooth and seamless transition between buck and boost modes. The modulator 400 of the buck-boost charger controller 221 only switches 2 transistors between each mode. DC regulation bottlenecks from the power stage are minimized. Operation has been described for continuous conduction mode (CCM), but the control system further provides natural transitions between CCM and a discontinuous conduction mode (DCM) (or diode emulation mode). The modulator 400 naturally controls the minimum on and off times of the transistors of the power stage. The control system uses hysteretic current mode control to facilitate stability and dynamic response. A linear relationship is maintained between control signal and inductor current for smooth mode transitions. The control system provides the benefit of controlling the switching frequency through the boundaries between the buck, buck-boost and boost regulation modes. The transitions are smooth and relatively continuous with the added buck-boost regulation mode. The following description of the remaining Figures show and describe different variations and embodiments for achieving controlled switching frequency.

The following FIGS. 6-14 are timing diagrams of different configurations of the modulator of FIG. 4 for generating the desired waveform of the ramp voltage VR1 shown in FIG. 5 during the buck, boost and buck-boost regulation modes. VC, VWP and VWN are plotted in each timing diagram in similar manner with certain variations as further described. VWPP and VWNN are plotted in those timing diagrams in which they are used for developing VR1. In each timing diagram, one or both of the additional ramp signals VR2 and VR3 are plotted, in which VR2 is plotting using a bolded solid line and VR3 is plotted using a bolded dashed line.

Figure 6:
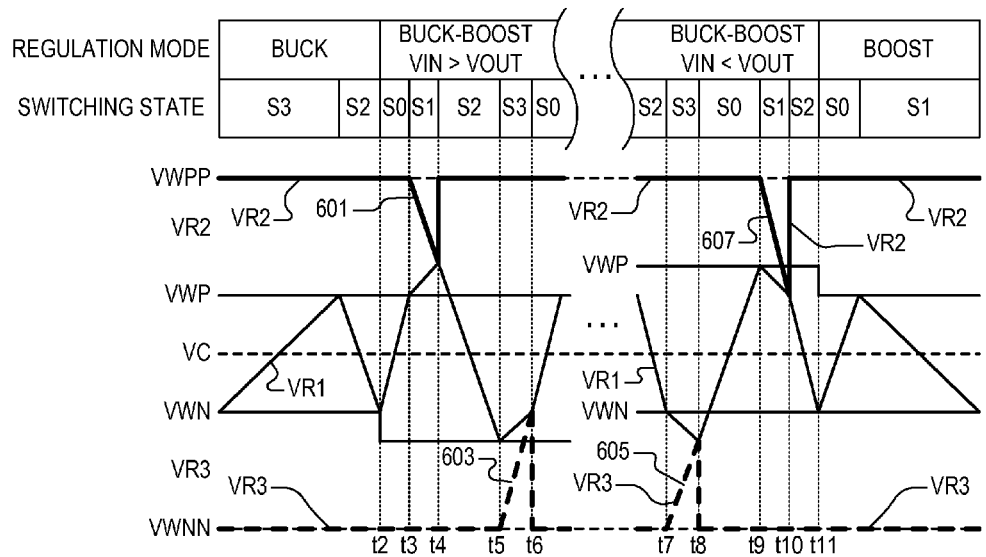
FIGS. 6-14 are timing diagrams of nine different configurations of the modulator of FIG. 4 for generating the desired waveform of the ramp voltage VR1 shown in FIG. 5 during the buck, boost and buck-boost regulation modes.

FIG. 6 is a timing diagram illustrating operation of a first configuration of the modulator 400 for generating the desired waveform of VR1 during the buck, boost and buck-boost regulation modes. The waveform of VR1 is substantially identical to that of FIG. 5. In this case, the modulator 400 includes both of the ramp circuits 430 and 450 to use both of the additional ramp signals VR2 and VR3 during the buck-boost regulation mode. As with FIG. 5, the chart above the timing diagram shows the regulation mode and the corresponding switching states and switching state transitions based on the times t2-t11. Also, operation shown in FIG. 6 is initially in the buck regulation mode in which operation transitions between the S2 and S3 switching states. At the time t2 when the buck-boost mode is indicated as previously described, operation transitions to the buck-boost regulation mode in which operation transitions between the four switching states S0-S3. At the time t11 when the boost mode is indicated, operation transitions to the boost regulation mode in which operation transitions between the S0 and S1 switching states.

In both of the buck and boost regulation modes, the ramp circuits 430 and 450 essentially remain in a standby mode to set initial states of the ramp voltages VR2 and VR3. The voltage source 449 is configured so that VP2 establishes the voltage VWPP at the negative terminal of the comparator 441. The switching controller 415 asserts CTRL3-CTRL6 to open switches 433, 434 and 447 and to close switch 445. In this manner, VR2 is clamped high at the voltage VWPP. Similarly, the voltage source 471 is configured so that VN3 establishes the voltage VWNN at the positive terminal of the comparator 463. The switching controller 415 asserts CTRL7-CTRL10 to open switches 453, 454 and 465 and to close switch 467. In this manner, VR3 is effectively clamped low at the voltage VWNN.

In this case, after switching to the buck-boost regulation mode at time t2, when VR1>VWP in switching state S0 as indicated by the control signal C1 asserted by the comparator 411 at time t3, the switching controller 415 transitions to switching state S1 and initiates VR2 to ramp down from VWPP as shown at 601. In order to initiate VR2, the switching controller 415 asserts CTRL5 low to open switch 445 and asserts CTRL4 high to close switch 434. The current source 435 begins discharging the capacitor 437 so that VR2 ramps down beginning at time t3. The slope of the down ramp VR2 shown at 601 is based on the current I2 established by the current source 435. In one embodiment, I2∝VOUT, so that VR2 ramps down at a rate based on the voltage level of VOUT.

During switching state S1, when VR1>VR2 as indicated by the control signal C3 asserted by the comparator 425 at time t4, the switching controller 415 transitions to the switching state S2 and resets VR2 back to VWPP by asserting CTRL5 high to re-close the switch 445 (and to re-open switch 434 to avoid contention between the current source 435 and the voltage source 449). In switching state S2, when VR1<VWN (adjusted by offset VOFSN) as indicated by the control signal C2 asserted by the comparator 413 at time t5, the switching controller 415 transitions to the switching state S3 and initiates VR3 as an up ramp from VWNN as shown at 603. The switching controller 415 initiates the ramp of VR3 by asserting CTRL10 low to open switch 467 and by asserting CTRL7 high to close switch 453, so that the current source 456 charges the capacitor 457 with current I3. In one embodiment, I3∝VIN so that the slope of VR3 is based on VIN. When VR1<VR3 as indicated by the control signal C8 asserted low by the comparator 473 at time t6, the switching controller 415 transitions to the switching state S0 and resets the VR3 ramp back to VWNN by closing switch 467 (and asserting CTRL7 low to open switch 453). VR1 ramps up during the switching state S0 after time t6 in a similar manner as shown between times t2 and t3.

Operation continues in similar manner as VIN drops below VOUT. When VIN<VOUT, VWN goes back to its nominal level VWN$_{NOM}$ and VWP is increased by the offset amount VOFSP as previously described. Again, when VR1<VWN as indicated by the control signal C2 at time t7, the switching controller 415 transitions to the switching state S3 and again initiates the up ramp VR3 from VWNN as shown at 605. When VR1<VR3 as indicated by control signal C8 at time t8, the switching controller 415 transitions to the switching state S0 and resets VR3 back to VWNN. In switching state S0, VR1 rises and when VR1>VWP (adjusted by VOFSP) as indicated by the control signal C1 at time t9, the switching controller 415 transitions to the switching state S1 and initiates the down ramp VR2 from VWPP as shown at 607. In this case, since VIN<VOUT, VR1 decreases during the switching state S1. The down ramp of VR2 at 607, which is based on VOUT, has a faster slope than VR1, which is based on the difference between VIN and VOUT, and when VR1>VR2 as indicated by the control signal C3 at time t10, the switching controller 415 transitions to the switching state S2 and resets VR2 back to VWPP. The negative slope of VR1 increases since based on VOUT alone during the switching state S2. If it has been determined that operation should transition from the buck-boost regulation mode to the boost mode, then in switching state S2, when VR1<VWN as indicated by the control signal C2 at time t11, the switching controller 415 transitions to the switching state S0 instead of state S3 since the boost regulation mode is indicated.

The configuration of the modulator 400 for generating the desired waveform of VR1 as shown in FIG. 6 provides the benefits and advantages as described herein for transitioning between the buck and boost regulation modes of operation, and for enabling smooth operation during the buck-boost regulation mode. In this case, additional upper and lower outer voltages VWPP and VWNN are used along with two additional ramp signals VR2 and VR3 to facilitate switching state transitions during the buck-boost regulation mode. In this embodiment, certain circuit simplifications may be made. For example, since VR2 only ramps down relative to VWPP, the current source 431 and switch 433 along with the voltage source 451, the switch 447 and the comparator 443 may be eliminated if desired. Also, since VR3 only ramps up relative to VWNN, the current source 455 and switch 454 along with the voltage source 469, the switch 465 and the comparator 461 may be eliminated if desired.

Figure 7:
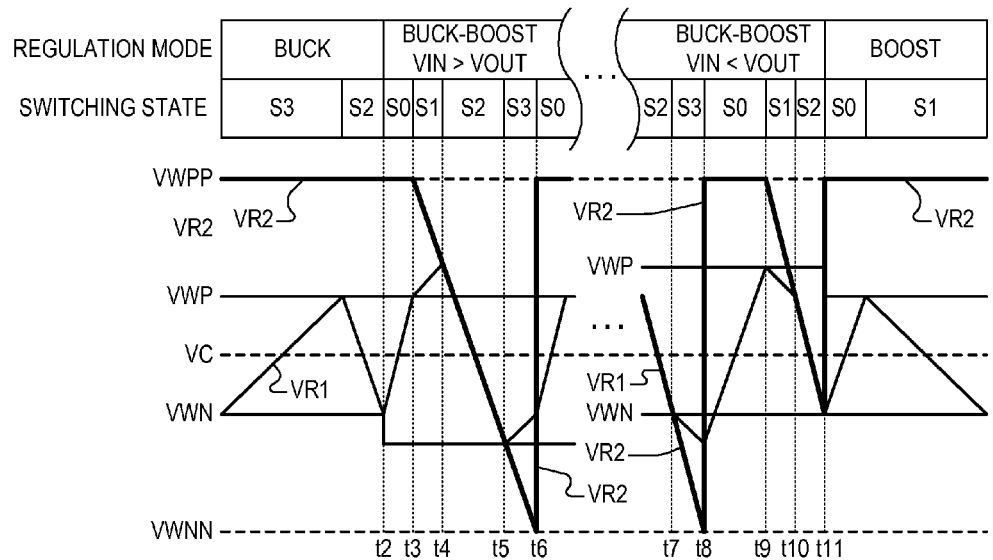

FIG. 7 is a timing diagram illustrating operation of a second configuration of the modulator 400 for generating the desired waveform of VR1 during the buck, boost and buck-boost regulation modes. The waveform of VR1 is substantially identical to that of FIG. 5. As with FIG. 5, the chart above the timing diagram shows the regulation mode and the corresponding switching states and switching state transitions based on the times t2-t11. Again, from left to right, the regulation mode transitions from the buck mode to the buck-boost mode and then to the boost mode (assuming that the voltage level of VIN decreases from a threshold level above VOUT to another threshold level below VOUT). The buck and boost modes are the same and are not further described. VWN and VWP are offset from their nominal levels during portions of the buck-boost regulation mode in the same manner.

In this case, VR2 ramps down from the voltage VWPP to VWNN and is reset back to VWPP again. In the ramp circuit 430, the voltage source 449 is configured so that VP2 establishes the voltage VWPP at the negative terminal of the comparator 441, and the voltage source 451 is configured so that VN2 establishes the voltage VWNN at the positive terminal of the comparator 443. In both of the buck and boost regulation modes, the switching controller 415 asserts CTRL5 high to clamp VR2 to VWPP.

Operation is similar in switching state S0 during the buck-boost regulation mode, so that when VR1>VWP as indicated by the control signal C1 at time t3, the switching controller 415 transitions to the switching state S1 and initiates the down ramp VR2 from VWPP. In order to initiate VR2, the switching controller 415 asserts CTRL5 low to open switch 445 and asserts CTRL4 high to close switch 434. The current source 435 begins discharging the capacitor 437 so that VR2 ramps down beginning at time t3. The slope of the down ramp VR2 is based on the current I2 established by the current source 435. In one embodiment, I2∝VOUT, so that VR2 ramps down at a rate based on (or otherwise proportional with) the voltage level of VOUT. Meanwhile, VR1 ramps up towards VR2 during the switching state S1.

In switching state S1, when VR1>VR2 as indicated by the control signal C3 at time t4, the switching controller 415 transitions to the switching state S2 so that VR1 reverses and ramps down. In this case, however, the switching controller 415 does not reset VR2 so that it continues to ramp down with VR1 at substantially the same rate. When VR1<VWN in switching state S2 as indicated by the control signal C2 at time t5, the switching controller 415 transitions to the switching state S3, and VR1 reverses and ramps up as shown. The switching controller 415 does not, however, reset VR2. Instead, VR2 continues to ramp down to VWNN in switching state S3. During the switching state S3, when VR2<VWNN as indicated by the control signal C5 asserted by the comparator 443 at time t6, VR2 is reset back to VWPP, the switching controller 415 transitions to the switching state S0, and VR1 ramps up at a faster rate as shown. The switching controller 415 resets VR2 by asserting CTRL5 to close the switch 445 to clamp VR2 back to VWPP.

For this point on in the description, it is understood that when a ramp signal, such as VR2 and VR3, is clamped to a particular voltage level, the applicable switches associated with a charging or discharging function, such as the switches 433 and 434 for the current sources 431 and 435 or the switches 453 and 454 for the current sources 456 and 455, may also be opened to avoid contention between the current and voltage sources. For example, when VR2 is clamped back to VWPP at time t6, the switching controller 415 also opens the switch 434 by asserting CTRL4 low.

Operation is substantially similar when VIN<VOUT except that VWP is now offset by VOFSP as previously described. The current I2 remains proportional to VOUT so that the slope of down ramping of VR2 continues to be based on VOUT. In the switching state S2 for the buck-boost regulation mode when VIN<VOUT, VR1 and VR2 are both ramping down at about the same rate. When VR1<VWN as indicated by the control signal C2 at time t7, the switching controller 415 transitions to the switching state S3. During the switching state S3, VR2 continues to ramp down at the same rate towards VWNN, while VR1 ramps down at a slower rate proportional to the difference between VIN and VOUT. When VR2<VWNN as indicated by the control signal C5 at time t8, the switching controller 415 resets VR2 back to VWPP and the switching controller 415 transitions to the switching state S0. VR1 reverses and ramps up during the switching state S0 as previously described.

Again, when in switching state S0, when VR1>VWP (adjusted) as indicated by the control signal C1 at time t9, the switching controller 415 transitions to the switching state S1 and initiates VR2 to ramp down from VWPP once again. In state S1, VR1 ramps down more slowly than VR2, and when VR1>VR2 as indicated by control signal C3 at time t10, the switching controller 415 transitions to the switching state S2 and both VR1 and VR2 ramp down at about the same rate. If it is indicated to change to the boost regulation mode, then when VR1<VWN as indicated by the control signal C1 at time t11, the switching controller 415 transitions to the switching state S0. Since the boost regulation mode is indicated, the switching controller 415 resets VR2 back to VWPP rather than allowing it to continue ramping to VWNN.

The configuration of the modulator 400 for generating the desired waveform of VR1 as shown in FIG. 7 provides the benefits and advantages as described herein for transitioning between the buck, buck-boost and boost regulation modes of operation, and for enabling smooth operation during the buck-boost regulation mode. In this case, the circuitry may be further simplified since the ramp circuit 450 and the comparator 473 may be eliminated entirely. Only a single down ramp is used during the buck-boost regulation mode, in which VR2 ramps down from VWPP to VWNN and then is reset back to VWPP. Furthermore, the current source 431 and the switch 433 may also be eliminated if desired.

Figure 8:
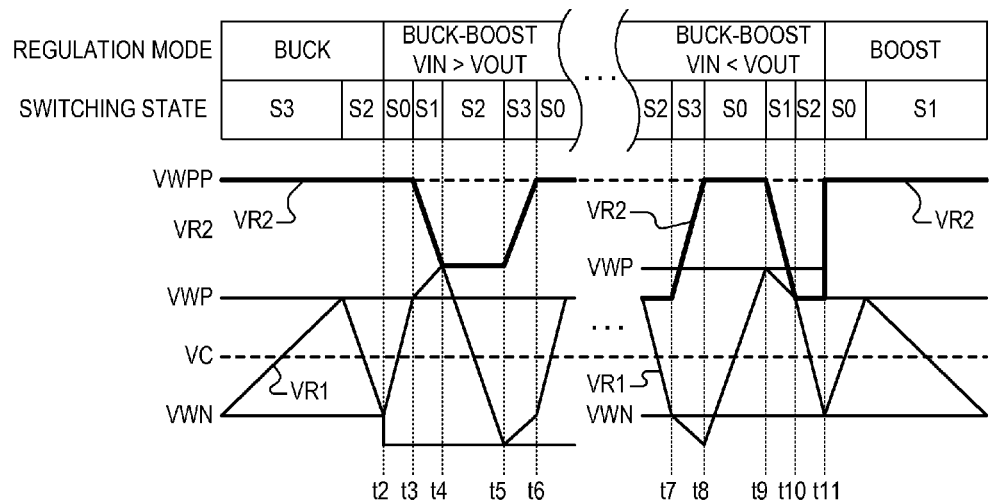

FIG. 8 is a timing diagram illustrating operation of a third configuration of the modulator 400 for generating the desired waveform of VR1 during the buck, boost and buck-boost regulation modes. The waveform of VR1 is substantially identical to that of FIG. 5. As with FIG. 5, the chart above the timing diagram shows the regulation mode and the corresponding switching states and switching state transitions based on the times t2-t11. Also, from left to right, the regulation mode transitions from the buck mode to the buck-boost mode and then to the boost mode. The buck and boost modes are the same and are not further described. VWN and VWP are offset from their nominal levels during portions of the buck-boost regulation mode in the same manner.

In this case, VR2 ramps down from the voltage VWPP in a similar manner, but rather than ramping down to VWNN, VR2 is held constant for a short period and then is ramped up back to VWPP. In the ramp circuit 430, the voltage source 449 is configured so that VP2 establishes the voltage VWPP at the negative terminal of the comparator 441. In both of the buck and boost regulation modes, the switching controller 415 asserts CTRL5 high to clamp VR2 to VWPP. The current sources 431 and 435 and the switches 433 and 434 are used to control switching operation. In one embodiment, I1=I2∝VOUT.

Operation is similar in switching state S0, so that when VR1>VWP as indicated by the control signal C1 at time t3, the switching controller 415 transitions to the switching state S1 and initiates the down ramp VR2 from VWPP. The switching controller 415 controls CTRL4 and CTRL5 in similar manner to initiate ramping. The current source 435 begins discharging the capacitor 437 so that VR2 ramps down at a rate based on the current I2 established by the current source 435. In one embodiment, I2∝VOUT, so that VR2 ramps down based on the voltage level of VOUT. Meanwhile, VR1 ramps up towards VR2 during the switching state S1.

In switching state S1, when VR1>VR2 as indicated by the control signal C3 at time t4, the switching controller 415 transitions to the switching state S2 so that VR1 ramps down. In this case, the switching controller 415 asserts CTRL4 low at time t4 to open the switch 434 so that VR2 does not ramp down but instead is held at the voltage level it reached at time t4. The capacitor 437 holds its charge between times t4 and t5. When VR1<VWN in switching state S2 as indicated by the control signal C2 at time t5, the switching controller 415 transitions to the switching state S3. The switching controller 415 asserts CTRL3 high at time t5 to close the switch 433 so that the capacitor 437 is charged by the current source 431. VR2 thus ramps up from time t5 at a rate proportional to the current I1, which is proportional to the voltage level of VOUT. In switching state S3, when VR2>VWPP as indicated by the control signal C4 asserted by the comparator 441 at time t6, the switching controller 415 transitions to the switching state S0 and re-clamps VR2 at VWPP by asserting CTRL5 to close the switch 445.

Operation is similar when VIN<VOUT, except that VWP is offset rather than VWM. Again, I1=I2∝VOUT. During the switching state S2, VR2 is held steady while VR1 ramps down until it falls below VWN. When VR1<VWN as indicated by the control signal C2 at time t7, the switching controller 415 transitions to the switching state S3 and asserts CTRL3 high to close the switch 433 so that the capacitor 437 is charged by current I1 so that VR2 ramps up. VR1 continues to ramp down during the switching state S3. When VR2>VWPP at time t8, the switching controller 415 transitions to the switching state S0, clamps VR2 to VWPP, and VR1 ramps up. When VR1>VWP (adjusted) at time t9, the switching controller 415 transitions to the switching state S1 and reinitiates VR2 down ramp. During the switching state S1, both VR1 and VR2 ramp down with VR2 ramping at a higher rate. When VR1>VR2 at time t10, the switching controller 415 transitions to the switching state S2 and holds VR2 steady until time t11. If the boost regulation mode is indicated, then when VR1<VWN at time t11, the switching controller 415 transitions to the switching state S0 and resets VR2 back to VWPP.

The configuration of the modulator 400 for generating the desired waveform of VR1 as shown in FIG. 8 provides the benefits and advantages as described herein for transitioning between the buck, buck-boost and boost regulation modes of operation, and for enabling smooth operation during the buck-boost regulation mode. In this case, the modulator 400 includes only the ramp circuit 430 for the ramp signal VR2 during the buck-boost regulation mode, in which the ramp circuit 450 and comparator 473 are not used and may be eliminated. Also, the circuitry associated with generating and comparing the lower voltage level VWNN may be eliminated. Thus, for example, the voltage source 451, the switch 447 and the comparator 443 may also be eliminated.

Figure 9:
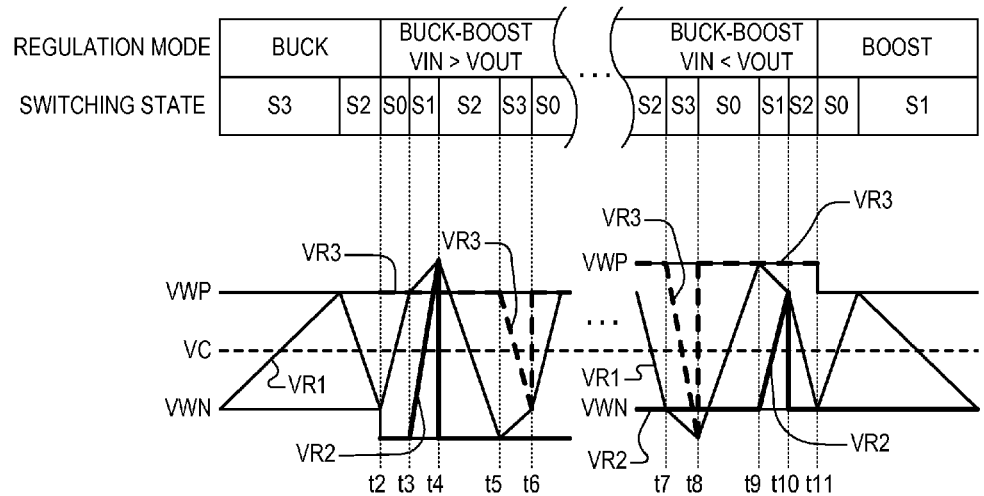

FIG. 9 is a timing diagram illustrating operation of a fourth configuration of the modulator 400 for generating the desired waveform of VR1 during the buck, boost and buck-boost regulation modes. The waveform of VR1 is substantially identical to that of FIG. 5. As with FIG. 5, the chart above the timing diagram shows the regulation mode and the corresponding switching states and switching state transitions based on the times t2-t11. Again, from left to right, the regulation mode transitions from the buck mode to the buck-boost mode and then to the boost mode. The buck and boost modes are the same and are not further described. VWN and VWP are offset from their nominal levels during portions of the buck-boost regulation mode in the same manner.

In this case, the upper and lower voltages VWPP and VWNN are eliminated. Instead, VR2 ramps up from the voltage level VWN and VR3 ramps down from VWP. In the ramp circuit 430, the voltage source 449, the comparator 441, the current source 435 and the switches 434 and 445 are not used or not provided. In one embodiment, the voltage source 451 may be configured so that VN2 establishes the voltage VWN at the positive terminal of the comparator 443. In another embodiment, a buffer circuit or the like (not shown) may be used to buffer the voltage VWN of the voltage source 421 to provide a buffered version of the voltage VWN at the positive input of the comparator 443. The switching controller 415 asserts CTRL6 high during the buck and boost regulation modes to clamp VR2 at the voltage VWN.

The ramp circuit 450 may be configured in similar manner, except for down ramp operation. Here, the voltage source 471, the comparator 463, the current source 456 and the switches 453 and 467 may be eliminated as unnecessary for operation. In one embodiment, the voltage source 469 may be configured so that VP3 establishes the voltage VWP at the negative terminal of the comparator 461. In another embodiment, a buffer circuit or the like (not shown) may be used to buffer the voltage VWP of the voltage source 419 to provide a buffered version of the voltage VWP at the negative input of the comparator 461. The switching controller 415 asserts CTRL9 high during the buck and boost regulation modes to clamp VR3 at the voltage VWP.

The current sources 431 and 455 are configured to generate the currents I1 and I4, respectively, for desired operation for the embodiment of FIG. 9 to develop the slopes of VR2 and VR3, respectively. The current I1 is configured according to the following expression (3):

$$VIN+ABS(VIN-VOUT)+MAX(VIN-VOUT,0) \quad (3)$$

in which ABS is the absolute value function, and MAX is the maximum one of the values in parenthesis. This relationship, along with the capacitance CR2, establishes the desired slope of VR2 when ramping up from VWN. The current I4 is configured according to the following expression (4):

$$-(VOUT+ABS(VIN-VOUT)+MAX(VOUT-VIN,0)) \quad (4)$$

This relationship, along with the capacitance CR3, establishes the desired slope of VR3 when ramping down from VWP. In the configuration shown in FIG. 9, VR2 ramps up at a rate based on the expression (3) and VR3 ramps down at a rate based on the expression (4).

At time t2 while in state S0 when the buck-boost regulation mode has been indicated, VR1 ramps up from VWN at a slope proportional to VIN as previously described. When VR1>VWP as indicated by the control signal C1 at time t3, the switching controller 415 transitions to the switching state S1 and asserts CTRL6 low and CTRL3 high to initiate ramping of VR2 up from VWN. Both VR1 and VR2 ramp up during the switching state S1, in which VR2 ramps up at a higher rate. When VR2>VR1 as indicated by the control signal C3 at time t4, the switching controller 415 transitions to the switching state S2 and resets VR2 back to VWN such as by opening switch 433 and closing switch 447. When VR1<VWM as indicated by the control signal C2 at time t5, the switching controller 415 transitions to the switching state S3 and asserts CTRL9 low and CTRL8 high to initiate ramping of VR3 down from VWP. During the switching state S3, VR1 ramps up while VR3 ramps down at the rates previously described. When VR3<VR1 as indicated by the control signal C8 at time t6, the switching controller 415 transitions to the switching state S0 and asserts CTRL9 high and CTRL8 low to reset VR3 back to VWP.

The switching rules are similar when VIN<VOUT. In state S2, VR3 is clamped at VWP and VR1 ramps down. When VR1<VWN as indicated by the control signal C2 at time t7, the switching controller 415 transitions to the switching state S3 and initiates VR3 to ramp down from VWP. In state S3, when VR1>VR3 as indicated by the control signal C8 at time t8, the switching controller 415 transitions to the switching state S0 and resets VR3 back to VWP. In the switching state S0, when VR1>VWP as indicated by the control signal C1 at time t9, the switching controller 415 transitions to the switching state S1 and initiates VR2 to ramp up from VWN. When VR2>VR1 as indicated by the control signal C3 at time t10, the switching controller 415 transitions to the switching state S2 and resets VR2 back to VWN. In state S2, when the boost regulation mode is indicated and VR1<VWN at time t11, operation transitions to state S0 of the boost regulation mode.

The configuration of the modulator 400 for generating the desired waveform of VR1 as shown in FIG. 9 provides the benefits and advantages as described herein for transitioning between the buck, buck-boost and boost regulation modes of operation, and for enabling smooth operation during the buck-boost regulation mode. In this case, the outer voltages VWNN and VWPP are eliminated which may reduce circuitry and simplify operation. In this case, the modulator 400 includes portions of both of the ramp circuits 430 and 450 to use both of the additional ramp signals VR2 and VR3 during the buck-boost regulation mode. Since VR2 is only ramped up from VWN, the circuitry associated with the current source 435 and the voltage source 449 may be eliminated if desired. Also, since VR3 is only ramped down from VWP, the circuitry associated with the current source 456 and the voltage source 471 may be eliminated if desired. In addition, VR2 is ramped up by current I1 according to the expression (3), and that VR3 is ramped down by current I4 according to the expression (4).

Figure 10:
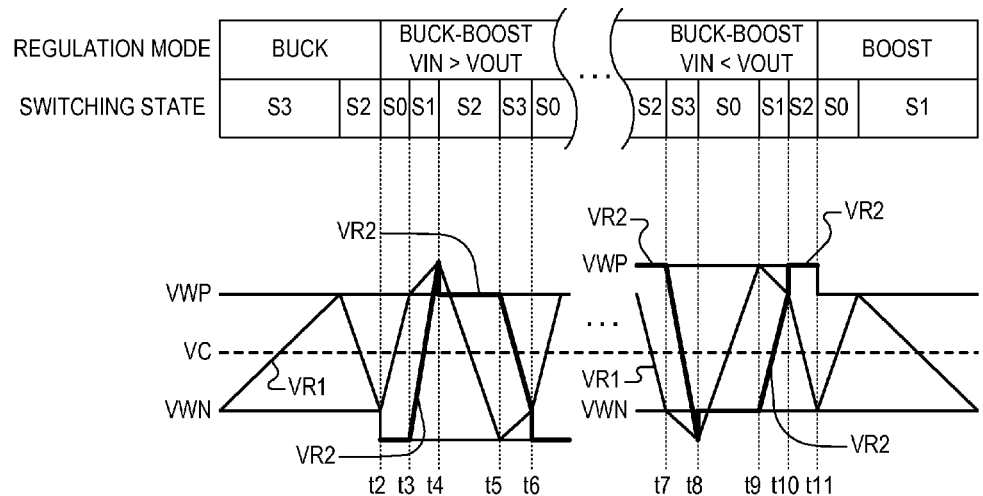

FIG. 10 is a timing diagram illustrating operation of a fifth configuration of the modulator 400 for generating the desired waveform of VR1 during the buck, boost and buck-boost regulation modes. The waveform of VR1 is substantially identical to that of FIG. 5. As with FIG. 5, the chart above the timing diagram shows the regulation mode and the corresponding switching states and switching state transitions based on the times t2-t11. Again, from left to right, the regulation mode transitions from the buck mode to the buck-boost mode and then to the boost mode. The buck and boost modes are the same and are not further described. VWN and VWP are offset from their nominal levels during portions of the buck-boost regulation mode in the same manner.

In this case, VR2 is used for both up and down ramps. In one embodiment, the voltage source 449 (VP2) is configured to assert VWP and the voltage source 451 (VN2) is configured to assert VWN. Alternatively, buffer amplifiers or the like (not show) may be used to buffer the voltage VWP to the negative input of the comparator 441 and to buffer the voltage of VWN to the positive input of the comparator 443. The current source 431 developing I1 is configured according to the expression (3) so that VR2 ramps up when the capacitor 437 is charged based on the expression (3). The current source 435 providing I2 is configured according to the expression (4) so that VR2 ramps down when the capacitor 437 is discharged based on the expression (4). The switching controller 415 asserts the control signals CTRL3-CTRL6 to control operation of VR2 in each of the switching states S0-S3 during the buck-boost regulation mode.

In the switching state S0 of the buck-boost regulation mode when VIN>VOUT, VR2 is clamped at VWN while VR1 ramps up towards VWP. When VR1>VWP (control signal C1) at time t3, the switching controller 415 transitions to the switching state S1 and controls CTRL3 and CTRL6 to initiate up ramping of VR2. When VR2>VR1 (control signal C3) at time t4, the switching controller 415 transitions to the switching state S2 and clamps VR2 at VWP (including asserting CTRL5 high to close switch 445). When VR1<VWN (control signal C2) at time t5, the switching controller 415 transitions to the switching state S3 and initiates down ramping of VR2 from VWP. When VR1>VR2 (control signal C3) at time t6, the switching controller 415 transitions to the switching state S0 and clamps VR2 at VWN.

In the buck-boost regulation mode when VIN<VOUT, switching operation is substantially similar. When VR1<VWN at time t7 while in switching state S2, the switching controller 415 transitions to the switching state S3 and initiates down ramping of VR2 from VWP. When VR1>VR2 at time t8 while in switching state S3, the switching controller 415 transitions to the switching state S0 and clamps VR2 low at VWN. When VR1>VWP at time t9 while in switching state S0, the switching controller 415 transitions to the switching state S1 and initiates up ramping of VR2 from VWN. When VR1<VR2 at time t10 while in switching state S1, the switching controller 415 transitions to the switching state S2 and clamps VR2 high at VWP. When VR1<VWN and the boost regulation mode is indicated at time t11, the switching controller 415 transitions to state S0 of the boost regulation mode.

The configuration of the modulator 400 for generating the desired waveform of VR1 as shown in FIG. 10 provides the benefits and advantages as described herein for transitioning between the buck, buck-boost and boost regulation modes of operation, and for enabling smooth operation during the buck-boost regulation mode. In this case, the modulator 400 includes only the ramp circuit 430 for the ramp signal VR2 during the buck-boost regulation mode, in which the ramp circuit 450 and the comparator 473 may be eliminated. The outer voltages VWPP and VWNN are also eliminated. VR2 is ramped up and down by the currents I1 and I2 according to the expressions (3) and (4), respectively.

Figure 11:
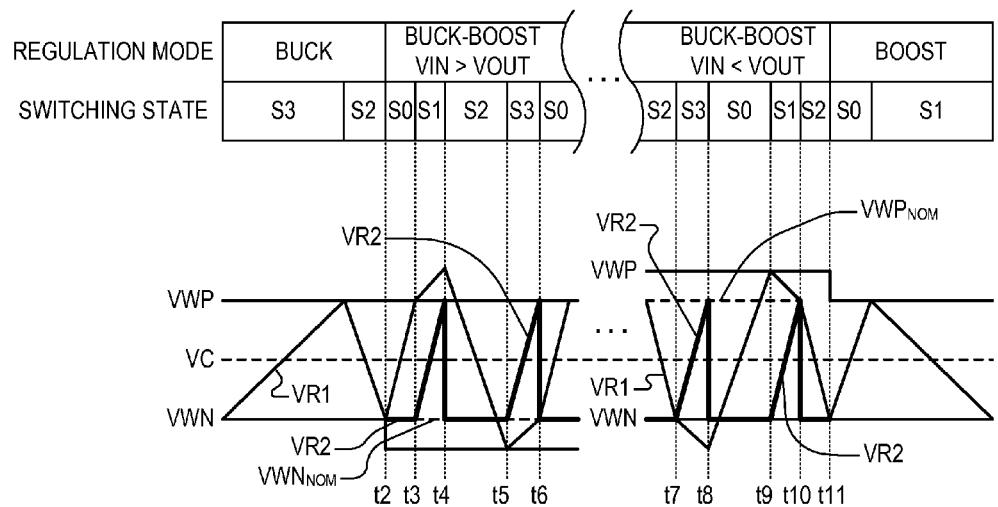

FIG. 11 is a timing diagram illustrating operation of a sixth configuration of the modulator 400 for generating the desired waveform of VR1 during the buck, boost and buck-boost regulation modes. The waveform of VR1 is substantially identical to that of FIG. 5. As with FIG. 5, the chart above the timing diagram shows the regulation mode and the corresponding switching states and switching state transitions based on the times t2-t11. Again, from left to right, the regulation mode transitions from the buck mode to the buck-boost mode and then to the boost mode. The buck and boost modes are the same and are not further described. VWN and VWP are offset from their nominal levels during portions of the buck-boost regulation mode in the same manner.

In this case, a single ramp VR2 is used as an up ramp that ramps up from the nominal voltage level of VWN, and ramp VR3 is not used. The voltage sources 419 and 421 are configured in the same manner previously described for configuring VP1 and VN1 as the voltages VWP and VWN, respectively, in which VWN is offset lower during the buck-boost regulation mode when VIN>VOUT while VWP is at its nominal level, and VWP is offset higher during the buck-boost regulation mode when VIN<VOUT while VWP is at its nominal level. The voltage source 449 is configured so that VP2 maintains the nominal level of VWP at the negative input of the comparator 441 throughout the buck-boost regulation mode. Also, the voltage source 451 is configured so that VN2 maintains the nominal level of VWN at the positive input of the comparator 443 throughout the buck-boost regulation mode. Furthermore, VR2 only ramps up from the nominal level of VWN to the nominal level of VWP, so that the current source 435 and the switch 434 are not provided or otherwise are not used. Also, the comparator 425 is not provided or not used.

The current source 431 is configured to develop I1 proportional to the maximum one of VIN and VOUT, or I1∝MAX(VIN, VOUT). Thus, when VIN>VOUT, VR2 ramps up at a rate proportional to VIN, and when VIN<VOUT, VR2 ramps up at a rate proportional to VOUT. The switching controller 415 monitors the control signals C1, C2, and C4 and asserts applicable ones of the control signals CTRL1-CTRL6 to control operation for each of the switching states S0-S3 in a similar manner as previously described.

In state S0 during the buck-boost regulation mode while VIN>VOUT, when VR1>VWP (control signal C1) at time t3, operation transitions to state S1 and VR2 ramps up from the nominal level of VWN at a rate proportional to VIN. In state S1, when VR2>VWP$_{NOM}$ at time t4 (control signal C4), operation transitions to state S2 and VR2 is reset back to VWN$_{NOM}$. In state S2, when VR1<VWN (adjusted) at time t5 (control signal C2), operation transitions to state S3 and VR2 ramps up again from the nominal level of VWN at a rate proportional to VIN. In state S3, when VR2>VWP$_{NOM}$ at time t6 (control signal C4), operation transitions to state S0 and VR2 is reset back to VWN$_{NOM}$.

When VIN<VOUT during the buck-boost regulation mode, when VR1<VWN at time t7 (control signal C2) in the switching state S2, operation transitions to switching state S3 and VR2 ramps up from the nominal level of VWN at a rate proportional to VOUT (since VOUT>VIN). When VR2>VWP$_{NOM}$ at time t8 (control signal C4), operation transitions to state S0 and VR2 is reset back to VWN$_{NOM}$. In state S0, when VR1>VWP (adjusted) at time t9 (control signal C1), operation transitions to state S1 and VR2 ramps up from VWN$_{NOM}$ at a rate proportional to VOUT. In state S1, when VR2>VWP$_{NOM}$ at time t10 (control signal C4), operation transitions to state S2 and VR2 is reset back to VWN. In state S2, when VR1<VWN at time t11 while the boost regulation mode is indicated, operation transitions to the boost regulation mode.

The configuration of the modulator 400 for generating the desired waveform of VR1 as shown in FIG. 11 provides the benefits and advantages as described herein for transitioning between the buck, buck-boost and boost regulation modes of operation, and for enabling smooth operation during the buck-boost regulation mode. In this case, the modulator 400 includes only the ramp circuit 430 to develop the ramp signal VR2 during the buck-boost regulation mode, in which the ramp circuit 450 and the comparator 473 are not used and may be eliminated. VR2 only ramps up and then is reset back to VWN, so that the current source 435 and switch 434 may be eliminated. Also, the comparator 425 may be eliminated. Furthermore, the configuration of the current source 433 developing the current I1 is simplified with a simpler computation as compared to the current computations of the embodiments of FIGS. 9 and 10.

Figure 12:
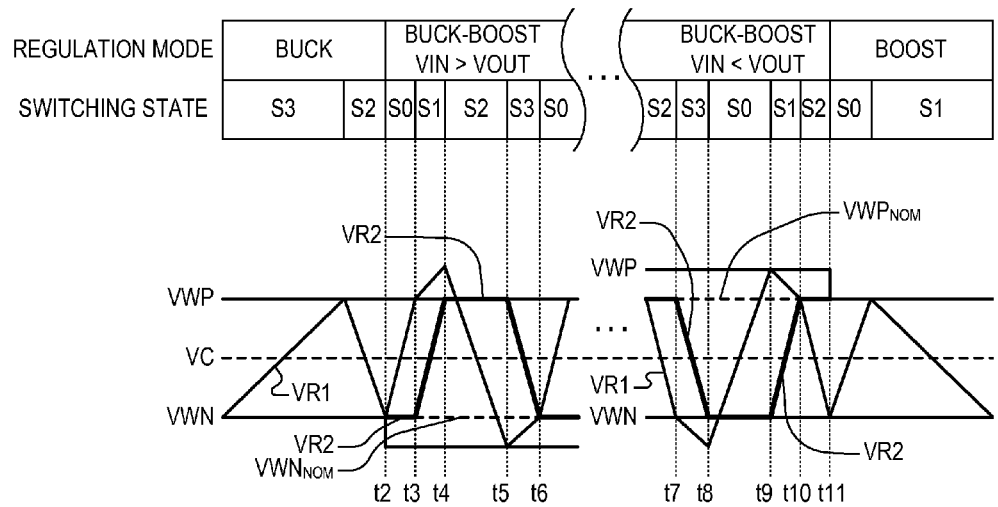

FIG. 12 is a timing diagram illustrating operation of a seventh configuration of the modulator 400 for generating the desired waveform of VR1 during the buck, boost and buck-boost regulation modes. The waveform of VR1 is substantially identical to that of FIG. 5. As with FIG. 5, the chart above the timing diagram shows the regulation mode and the corresponding switching states and switching state transitions based on the times t2-t11. Again, from left to right, the regulation mode transitions from the buck mode to the buck-boost mode and then to the boost mode. The buck and boost modes are the same and are not further described. VWN and VWP are offset from their nominal levels during portions of the buck-boost regulation mode in the same manner.

In this case, the modulator 400 is configured similar to that of the embodiment of FIG. 11, except that the current source 435 and the switch 434 are included to develop VR2 as a down ramp. The current source 435 develops I2 in the same manner as I1, in which I1=I2∝MAX(VIN, VOUT). Thus, VR2 ramps up and down at a rate based on the maximum one of VIN and VOUT. The switching controller 415 asserts CTRL3 high and CTRL4 low to ramp VR2 up, and asserts CTRL3 low and CTRL4 high to ramp VR2 down. Also, VR2 is held or clamped at the nominal level of VWP or VWN rather than being reset back to VWN. For example, the switching controller 415 clamps VR2 at VWP$_{NOM}$ by asserting CTRL5 high, and clamps VR2 at VWN$_{NOM}$ by asserting CTRL6 high.

In state S0 during the buck-boost regulation mode while VIN>VOUT, when VR1>VWP at time t3, operation transitions to state S1 and VR2 ramps up from the nominal level of VWN at a rate proportional to VIN. In state S1, when VR2>VWP$_{NOM}$ at time t4, operation transitions to state S2 and VR2 is clamped to VWP$_{NOM}$. In state S2, when VR1<VWN (adjusted) at time t5, operation transitions to state S3 and VR2 ramps down from VWP$_{NOM}$ at a rate proportional to VIN. In state S3, when VR2<VWN$_{NOM}$ at time t6, operation transitions to state S0 and VR2 is clamped at VWN$_{NOM}$.

In state S2 during the buck-boost regulation mode while VIN<VOUT, when VR1<VWN at time t7, operation transitions to state S3 and VR2 ramps down from VWP$_{NOM}$ at a rate proportional to VOUT. In state S3, when VR2<VWN$_{NOM}$ at time t8, operation transitions to state S0 and VR2 is clamped at VWN$_{NOM}$. In state S0, when VR1>VWP (adjusted) at time t9, operation transitions to state S1 and VR2 ramps up from VWN$_{NOM}$ at a rate proportional to VOUT. In state S1 when VR2>VWP$_{NOM}$ at time t10, operation transitions to state S2 and VR2 is clamped at VWP$_{NOM}$. In state S2, when VR1<VWN and the boost regulation mode is indicated at time t11, operation transitions to the switching state S0 of the boost regulation mode.

The configuration of the modulator 400 for generating the desired waveform of VR1 as shown in FIG. 12 provides the benefits and advantages as described herein for transitioning between the buck, buck-boost and boost regulation modes of operation, and for enabling smooth operation during the buck-boost regulation mode. In this case, the modulator 400 includes only the ramp circuit 430 to develop an up and down ramp signal VR2 during the buck-boost regulation mode, in which the ramp circuit 450 and the comparator 473 are not used and may be eliminated. Also, the comparator 425 may be eliminated. Since VR2 ramps up and down, both current sources 431 and 435 are used, but each with a simpler computation as compared to the current computations of the embodiments of FIGS. 9 and 10.

Figure 13:
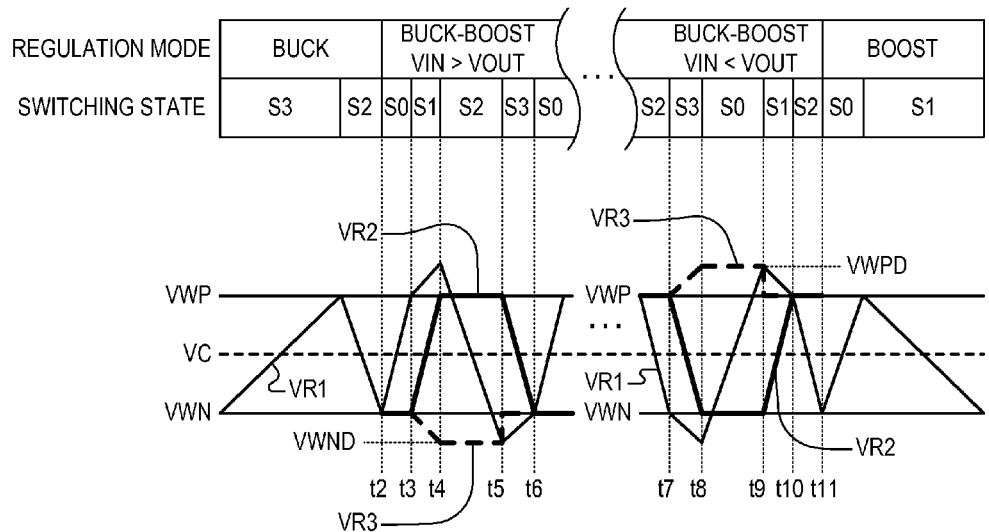

FIG. 13 is a timing diagram illustrating operation of an eighth configuration of the modulator 400 for generating the desired waveform of VR1 during the buck, boost and buck-boost regulation modes. The waveform of VR1 is substantially identical to that of FIG. 5. As with FIG. 5, the chart above the timing diagram shows the regulation mode and the corresponding switching states and switching state transitions based on the times t2-t11. Again, from left to right, the regulation mode transitions from the buck mode to the buck-boost mode and then to the boost mode. The buck and boost modes are the same and are not further described. In this case, VWN and VWP are not offset from their nominal levels during the buck-boost regulation mode. Instead, VR3 is used to develop offset signals VWND and VWPD relative to the nominal levels of VWN and VWP as further described herein.

The ramp circuit 430 for developing VR2 is configured substantially the same as that shown and described for the embodiment of FIG. 12, in which VR2 ramps up and down between the nominal levels of VWN and VWP and is clamped to VWP$_{NOM}$ during the switching state S2 and is clamped to VWN$_{NOM}$ during the switching state S0 during the buck-boost regulation mode. The voltages VP1 and VN1 of the voltage sources 419 and 421 are also set to the nominal levels of VWP and VWN, respectively. The comparators 411 and 413 are used to develop the control signals C1 and C2 only during the buck and boost regulation modes, but not during the buck-boost regulation mode. The current sources 431 and 435 for developing the currents I1 and I2 are the same as that of FIG. 12, in which I1=I2∝MAX(VIN, VOUT).

In the ramp circuit 450, the voltage sources 469 and 471 developing the voltages VP3 and VN3 may also be set to the nominal voltage levels of VWP and VWN, respectively. In an alternative embodiment, buffer amplifiers or the like (not shown) may be used to set the voltage at the negative input of the comparator 461 at the nominal level of VWP, and to set the voltage at the positive input of the comparator 463 at the nominal level of VWN. In either case, the switching controller 415 may clamp VR3 to the nominal level of VWP by closing switch 465, or may clamp VR3 to the nominal level of VWN by closing switch 467.

During the buck-boost regulation mode when VIN>VOUT, VR3 is clamped to $VWN_{NOM}$ during the switching state S0, and then is ramped down at a rate based on the difference between VIN and VOUT during state S1. Thus, the current source 456 develops I3∝VOUT and the current source 455 develops I4∝VIN, and the switching controller 415 asserts CTRL7 and CTRL8 high to close both switches 453 and 454 to ramp VR3 accordingly. During the switching state S2, the switches of the ramp circuit 450 are opened so that VR3 holds steady at a voltage level VWND until the switching state S3, when VR3 is re-clamped to $VWN_{NOM}$.

During the buck-boost regulation mode when VIN<VOUT, VR3 is instead clamped to $VWP_{NOM}$ during the switching state S2, and then is ramped up at a rate based on the difference between VIN and VOUT during state S3. Since the current source 453 develops I3∝VOUT and the current source 455 develops I4∝VIN, VR3 ramps up when the switching controller 415 asserts CTRL7 and CTRL8 high to close both switches 453 and 454. During the switching state S0, the switches of the ramp circuit 450 are opened so that VR3 holds steady at a voltage level VWPD until the switching state S1, when VR3 is re-clamped to $VWP_{NOM}$.

During the buck-boost regulation mode when VIN is about the same as VOUT, or VIN≈VOUT (such as within a small predetermined voltage threshold), VR3 is clamped at $VWN_{NOM}$ during states S1 and S2 and is clamped at $VWP_{NOM}$ during states S3 and S0. When VIN and VOUT are about the same, then VWPD is about equal to $VWP_{NOM}$ and VWND is about equal to $VWN_{NOM}$. During this condition, the switches 469 and 471 are switched sufficiently quickly during the S2 to S3 and S0 to S1 switching state transitions so that VR3 has time to settle to the nominal level of either VWP or VWN. In an alternative embodiment, a separate ramp circuit may be provided, so that VR3 ramps down from $VWN_{NOM}$ and another ramp VR4 (not shown) ramps up from $VWP_{NOM}$.

In state S0 during the buck-boost regulation mode when VIN>VOUT, when VR1>$VWP_{NOM}$ at time t3 (control signal C1), operation transitions to state S1 and VR2 ramps up from the nominal level of VWN at a rate proportional to VIN. Also, VR3 ramps down beginning at time t3 from the nominal level of VWN at a rate proportional to VIN−VOUT to develop the voltage VWND. In state S1, when VR2>VWP at time t4 (control signal S4), operation transitions to state S2 and VR2 is clamped at VWP. Also, the down ramp action of VR3 is stopped so that VR3 is held constant at VWND. The voltage of VWND relative to the nominal level VWN is variable depending upon the difference between VIN and VOUT. Thus, rather than pre-calculate VWND, it is determined by waveform comparison. In state S2, when VR1<VR3 at VWND at time t5 (control signal C8), operation transitions to state S3 and VR2 ramps down from $VWP_{NOM}$ at a rate proportional to VIN. Also, VR3 is reset back (or clamped) to the nominal level of VWN. In state S3, when VR2<$VWN_{NOM}$ at time t6, operation transitions to state S0 and VR2 is clamped at the nominal level of VWN.

In state S2 during the buck-boost regulation mode when VIN>VOUT, VR3 is clamped at the nominal level of VWP. When VR1<$VWN_{NOM}$ at time t7 (control signal C2), operation transitions to switching state S3, VR2 is ramped down from $VWP_{NOM}$ at a rate proportional to VOUT, and VR3 is ramped up from $VWP_{NOM}$ at a rate based on VOUT−VIN. In state S3, when VR2<$VWN_{NOM}$ at time t8 (control signal C5), operation transitions to state S0 and VR3 is held steady, which becomes VWPD for this switching cycle. Again, VWPD varies based on the nominal level of VWP and the difference between VIN and VOUT. Also in state S0, VR2 is clamped at $VWN_{NOM}$. In state S0, when VR1>VR3 (at VWPD) at time t9 (control signal C8), operation transitions to switching state S1, VR3 is reset back to the nominal level of VWP, and VR2 begins ramping up from the nominal level of VWN at a rate proportional to VIN. In state S1, when VR2>$VWP_{NOM}$ at time t10 (control signal C4), operation transitions to state S2 and VR2 is clamped at $VWP_{NOM}$. If conditions indicate change to boost regulation mode, then at time t11, operation transitions to state S0 of the boost regulation mode.

The configuration of the modulator 400 for generating the desired waveform of VR1 as shown in FIG. 13 provides the benefits and advantages as described herein for transitioning between the buck, buck-boost and boost regulation modes of operation, and for enabling smooth operation during the buck-boost regulation mode. In this case, the modulator 400 includes the ramp circuit 430 to develop an up and down ramp signal VR2 during the buck-boost regulation mode. The complications associated with offsetting VWN and VWP from their nominal levels is not provided. However, the modulator 400 does include the ramp circuit 450 to generate separate offset signals VWND and VWPD.

Figure 14:
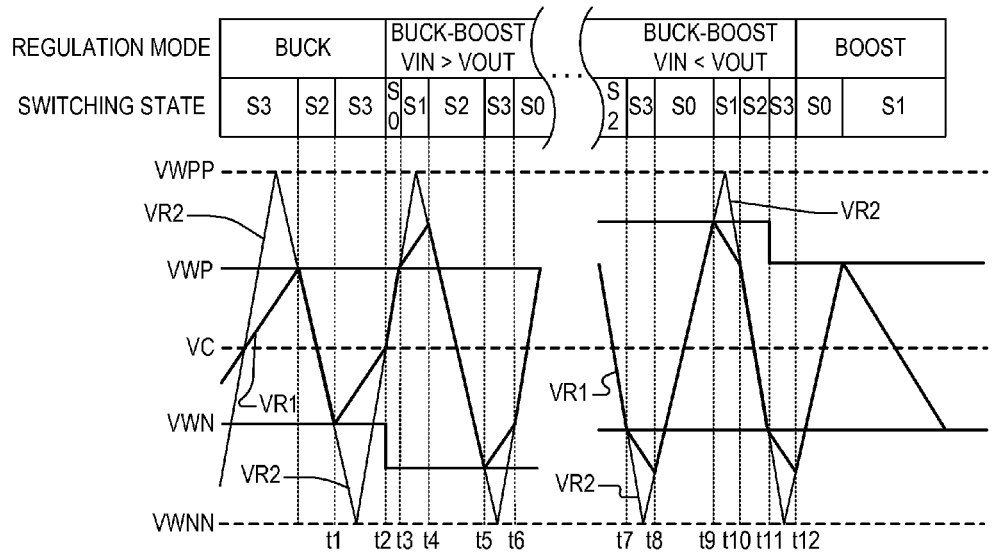

FIG. 14 is a timing diagram illustrating operation of a ninth configuration of the modulator 400 for generating the desired waveform of VR1 during the buck, boost and buck-boost regulation modes. The waveform of VR1 is substantially similar to that of FIG. 5. As with FIG. 5, the chart above the timing diagram shows the regulation mode and the corresponding switching states and switching state transitions based on the times t1-t11. Again, from left to right, the regulation mode transitions from the buck mode to the buck-boost mode and then to the boost mode. The buck and boost modes are the same and are not further described. VWN and VWP are offset from their nominal levels during portions of the buck-boost regulation mode in the same manner. In this case, VR2 is plotted with a lighter solid line than VR1 for clarity.

In this case, the upper and lower voltages VWPP and VWNN are included on either side of VWN and VWP. In one embodiment during the buck and boost regulation modes, VR2 is synchronized with the switching of VR1, but is not used for determination of switching points. Instead, VR2 remains synchronized to facilitate transition to and from the buck-boost regulation mode. In another embodiment, VR2 remains clamped at either VWP or VWN, and begins ramping only when the buck-boost regulation mode is indicated and VR1 intersects either VWP or VWN. As shown in FIG. 14, for example, before a time t1, VR2 is clamped at VWN when the buck-boost regulation mode is indicated. When VR1 next intersects VWN as shown at time t1, VR2 is triggered and begins ramping down towards VWNN. When VR2<VWNN, VR2 ramps back up towards VWPP. When VR2>VR1 (or when they intersect) at time t2, operation transitions to the buck-boost regulation mode. In either embodiment, once VR2 is initiated, it ramps up and down with a triangular waveform between VWPP and VWNN, in which VR2 ramps up at a rate proportional to VIN, and ramps down at a rate proportional to VOUT.

When VR2>VR1 at time t2 at the transition between the buck and buck-boost regulation modes, operation transitions to state S0, in which VR2 ramps up at about the same rate as VR1. When VR1>VWP at time t3, operation transitions to the switching state S1. VR2, however, continues to ramp up to VWPP, and when VR2>VWPP, VR2 switches and begins ramping down during the switching state S1. When VR1>VR2 at time t4 (control signal C3), operation transitions to state S2. In state S2, when VR1<VWN (adjusted) at time t5 (control signal C2), operation transitions to state S3 in which VR1 begins ramping back up. VR2, however, continues to ramp down to VWNN, and when VR2<VWNN, VR2 switches and begins ramping up during the switching state S3. When VR2>VR1 at time t6, operation transitions to state S0.

Operation during the buck-boost regulation mode while VIN<VOUT is similar. In state S2, when VR1<VWN at time t7, operation transitions to state S3 while VR2 continues to ramp down to VWNN. When VR2<VWNN, VR2 switches and begins ramping up. In state S3, when VR2>VR1 at time t8, operation transitions to the switching state S0. In state S0, when VR1>VWP (adjusted) at time t9, operation transitions to switching state S1 while VR2 continues to ramp up towards VWPP. When VR2>VWPP, VR2 switches and begins ramping down. In state S1, when VR2<VR1 at time t10, operation transitions to switching state S2. Operation transitions to state S3 at time t11 in similar manner. At this point, the buck-boost regulation mode may be indicated, in which VWP is reset back to its nominal voltage level. At time t12 when VR2>VR1, operation transitions to switching state S0 of the boost regulation mode. VR2 may continue ramping synchronous with VR1, or may instead remain clamped at VWN or VWP until the buck-boost regulation mode is once again indicated.

The configuration of the modulator 400 for generating the desired waveform of VR1 as shown in FIG. 14 provides the benefits and advantages as described herein for transitioning between the buck, buck-boost and boost regulation modes of operation, and for enabling smooth operation during the buck-boost regulation mode. In this case, the modulator 400 includes only the ramp circuit 430 for the ramp signal VR2 during the buck-boost regulation mode, in which the ramp circuit 450 is not used and may be eliminated. VR2 does ramp between the outer voltages VWPP and VWNN, but the configurations for the currents I1 and I2 are relatively simple since only based on VIN or VOUT.

The benefits, features, and advantages of the present invention are now better understood with regard to the foregoing description and accompanying drawings. The foregoing description was presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. For example, several different configurations are described for the modulator 400 in which circuitry may be eliminated when not used. However, the modulator 400 may simply be implemented with the circuitry illustrated in which only those portions used for a selected configuration are activated. The present invention is not intended to be limited to the particular embodiments shown and described herein, but is to be accorded the widest scope consistent with the principles and novel features herein disclosed. Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:

1. An electronic device, comprising:
   a hysteretic current mode buck-boost voltage regulator, comprising:
   a buck-boost voltage converter for converting an input voltage to an output voltage as controlled by a switching controller that toggles said buck-boost voltage converter between first and second switching states in a boost regulation mode and that toggles said buck-boost voltage converter between third and fourth switching states in a buck regulation mode;
   a primary window circuit comprising a first voltage source that develops a first upper voltage above a regulation control voltage, a second voltage source that develops a first lower voltage below said regulation control voltage, wherein a difference between said first upper and first lower voltages forms a window voltage;
   a primary ramp circuit that provides a primary ramp voltage relative to said regulation control voltage, wherein said primary ramp voltage ramps up at a rate proportional to said input voltage in said first switching state, ramps down at a rate proportional to said output voltage in said third switching state, and ramps proportional to a difference between said input and output voltages in said second and fourth switching states;
   wherein during said buck-boost regulation mode, said switching controller transitions from said first switching state to said second switching state when said primary ramp voltage reaches said first upper voltage, transitions from said second switching state to said third switching state in response to a first timing indication, transitions from said third switching state to said fourth switching state when said primary ramp voltage reaches said first lower voltage, and transitions from said fourth switching state to said first switching state in response to a second timing indication; and
   a timing circuit that provides said first and second timing indications to said switching controller to ensure that said second and fourth switching states have approximately the same duration.

2. The electronic device of claim 1, wherein:
   said first voltage source increases said first upper voltage by a positive offset voltage above a nominal level of said first upper voltage based on a difference between said input and output voltages and a nominal level of said window voltage when said input voltage is less than said output voltage;
   wherein said second voltage source decreases said first lower voltage by a negative offset voltage below a nominal level of said first lower voltage based on a difference between said input and output voltages and said nominal level of said window voltage when said input voltage is greater than said output voltage; and
   wherein said timing circuit comprises:
   a third voltage source that develops a second upper voltage above said nominal level of said first upper voltage by said nominal level of said window voltage;
   a fourth voltage source that develops a second lower voltage below said nominal level of said first lower voltage by said nominal level of said window voltage;

a second ramp circuit that provides a second ramp voltage during said buck-boost regulation mode, wherein said second ramp voltage ramps down from said second upper voltage at a rate proportional to said output voltage beginning when transitioning to said second switching state and then resets back to said second upper voltage upon reaching said second lower voltage;

a first comparator that provides said first timing indication when said second ramp voltage reaches said primary ramp voltage; and a second comparator that provides said second timing indication when said second ramp voltage reaches said second lower voltage.

3. The electronic device of claim 1, wherein:

said first voltage source increases said first upper voltage by a positive offset voltage above a nominal level of said first upper voltage based on a difference between said input and output voltages and a nominal level of said window voltage when said input voltage is less than said output voltage;

wherein said second voltage source decreases said first lower voltage by a negative offset voltage below a nominal level of said first lower voltage based on a difference between said input and output voltages and said nominal level of said window voltage when said input voltage is greater than said output voltage; and wherein said timing circuit comprises:
a third voltage source that develops a second upper voltage above said nominal level of said first upper voltage by said nominal level of said window voltage;

a second ramp circuit that provides a second ramp voltage during said buck-boost regulation mode, wherein said second ramp voltage ramps down from said second upper voltage at a rate proportional to said output voltage beginning when transitioning to said second switching state until said first timing indication is provided, wherein said second ramp voltage is held at a steady voltage in response to said first timing indication, and wherein said second ramp voltage ramps up at a rate proportional to said output voltage in response to transitioning to said fourth switching state;

a first comparator that provides said first timing indication when said second ramp voltage reaches said primary ramp voltage; and a second comparator that provides said second timing indication when said second ramp voltage reaches said second upper voltage.

4. The electronic device of claim 1, wherein:

said first voltage source increases said first upper voltage by a positive offset voltage above a nominal level of said first upper voltage based on a difference between said input and output voltages and a nominal level of said window voltage when said input voltage is less than said output voltage;

wherein said second voltage source decreases said first lower voltage by a negative offset voltage below a nominal level of said first lower voltage based on a difference between said input and output voltages and said nominal level of said window voltage when said input voltage is greater than said output voltage; and wherein said timing circuit comprises:
a second ramp circuit that provides a second ramp voltage during said buck-boost regulation mode, wherein said second ramp voltage ramps up from said first lower voltage at a rate proportional to said input voltage plus an absolute value of a difference between said input and output voltages plus a maximum one of zero and a difference between said input and output voltages beginning when transitioning to said second switching state until said first timing indication is provided, and then goes to said first upper voltage, wherein said second ramp voltage ramps down from said first upper voltage at a rate proportional to said output voltage plus an absolute value of a difference between said input and output voltages plus a maximum one of zero and a difference between said input and output voltages in response to transitioning to said fourth switching state until said second timing indication is provided, and then goes to said first lower voltage;

a first comparator that provides said first timing indication when said second ramp voltage reaches said primary ramp voltage while said second ramp voltage is ramping up; and a second comparator that provides said second timing indication when said second ramp voltage reaches said primary ramp voltage while said second ramp voltage is ramping down.

5. The electronic device of claim 1, wherein:

said first voltage source increases said first upper voltage by a positive offset voltage above a nominal level of said first upper voltage based on a difference between said input and output voltages and a nominal level of said window voltage when said input voltage is less than said output voltage;

wherein said second voltage source decreases said first lower voltage by a negative offset voltage below a nominal level of said first lower voltage based on a difference between said input and output voltages and said nominal level of said window voltage when said input voltage is greater than said output voltage; and wherein said timing circuit comprises:
a third voltage source that provides said nominal level of said first upper voltage and a fourth voltage source that provides said nominal level of said first lower voltage;

a second ramp circuit that provides a second ramp voltage during said buck-boost regulation mode, wherein said second ramp voltage ramps up from said nominal level of said first lower voltage at a rate proportional to a maximum one of said input and output voltages beginning when transitioning to said second switching state until said first timing indication is provided, wherein said second ramp voltage ramps up at a rate proportional to a maximum one of said input and output voltages in response to transitioning to said fourth switching state, and wherein said second ramp voltage is reset back to said first lower voltage in response to each of said first and second timing indications;

a first comparator that provides said first timing indication when said second ramp voltage reaches said nominal level of said first upper voltage during said second switching state; and a second comparator that provides said second timing indication when said second ramp voltage reaches said nominal level of said first upper voltage during said fourth switching state.

6. The electronic device of claim 1, wherein:

said first voltage source increases said first upper voltage by a positive offset voltage above a nominal level of said first upper voltage based on a difference between said input and output voltages and a nominal level of said window voltage when said input voltage is less than said output voltage;

wherein said second voltage source decreases said first lower voltage by a negative offset voltage below a nominal level of said first lower voltage based on a difference between said input and output voltages and said nominal level of said window voltage when said input voltage is greater than said output voltage; and wherein said timing circuit comprises:
- a third voltage source that provides said nominal level of said first upper voltage and a fourth voltage source that provides said nominal level of said first lower voltage;
- a second ramp circuit that provides a second ramp voltage during said buck-boost regulation mode, wherein said second ramp voltage ramps up from said nominal level of said first lower voltage at a rate proportional to a maximum one of said input and output voltages beginning when transitioning to said second switching state until said first timing indication is provided, wherein said second ramp voltage ramps down at a rate proportional to a maximum one of said input and output voltages in response to transitioning to said fourth switching state until said second timing indication is provided, wherein said second ramp voltage remains at said nominal level of said first upper voltage in response to said first timing indication, and wherein said second ramp voltage remains at said nominal level of said first lower voltage in response to said second timing indication;
- a first comparator that provides said first timing indication when said second ramp voltage reaches said nominal level of said first upper voltage; and
- a second comparator that provides said second timing indication when said second ramp voltage reaches said nominal level of said first lower voltage.

7. The electronic device of claim 1, wherein:

said first voltage source increases said first upper voltage by a positive offset voltage above a nominal level of said first upper voltage based on a difference between said input and output voltages and a nominal level of said window voltage when said input voltage is less than said output voltage;

wherein said second voltage source decreases said first lower voltage by a negative offset voltage below a nominal level of said first lower voltage based on a difference between said input and output voltages and said nominal level of said window voltage when said input voltage is greater than said output voltage; and wherein said timing circuit comprises:
- a third voltage source that develops a second upper voltage above said nominal level of said first upper voltage by said nominal level of said window voltage;
- a fourth voltage source that develops a second lower voltage below said nominal level of said first lower voltage by said nominal level of said window voltage;
- a second ramp circuit that provides a second ramp voltage during said buck-boost regulation mode, wherein said second ramp voltage repeatedly ramps up from said second lower voltage to said second upper level at a rate proportional to said input voltage and ramps down from said second upper level to said second lower level at a rate proportional to said output voltage;
- a first comparator that provides said first timing indication when said second ramp voltage reaches said primary ramp voltage when ramping down from said second upper level; and
- a second comparator that provides said second timing indication when said second ramp voltage reaches said primary ramp voltage when ramping up from said second lower level.

8. The electronic device of claim 1, wherein:

said first voltage source increases said first upper voltage by a positive offset voltage above a nominal level of said first upper voltage based on a difference between said input and output voltages and a nominal level of said window voltage when said input voltage is less than said output voltage;

wherein said second voltage source decreases said first lower voltage by a negative offset voltage below a nominal level of said first lower voltage based on a difference between said input and output voltages and said nominal level of said window voltage when said input voltage is greater than said output voltage; and wherein said timing circuit comprises:
- a third voltage source that develops a second upper voltage above said nominal level of said first upper voltage by said nominal level of said window voltage;
- a fourth voltage source that develops a second lower voltage below said nominal level of said first lower voltage by said nominal level of said window voltage;
- a second ramp circuit that provides a second ramp voltage during said buck-boost regulation mode, wherein said second ramp voltage ramps down from said second upper voltage at a rate proportional to said output voltage beginning when transitioning to said second switching state, and then resets back to said second upper voltage in response to said first timing indication;
- a third ramp circuit that provides a third ramp voltage during said buck-boost regulation mode, wherein said third ramp voltage ramps up from said second lower voltage at a rate proportional to said input voltage beginning when transitioning to said fourth switching state, and then resets back to said second lower voltage in response to said second timing indication;
- a first comparator that provides said first timing indication when said second ramp voltage reaches said primary ramp voltage; and
- a second comparator that provides said second timing indication when said third ramp voltage reaches said primary ramp voltage.

9. The electronic device of claim 1, wherein:

said first voltage source increases said first upper voltage by a positive offset voltage above a nominal level of said first upper voltage based on a difference between said input and output voltages and a nominal level of said window voltage when said input voltage is less than said output voltage;

wherein said second voltage source decreases said first lower voltage by a negative offset voltage below a nominal level of said first lower voltage based on a difference between said input and output voltages and said nominal level of said window voltage when said input voltage is greater than said output voltage; and wherein said timing circuit comprises:
- a second ramp circuit that provides a second ramp voltage during said buck-boost regulation mode, wherein said second ramp voltage ramps up from said first lower voltage at a rate proportional to said input voltage plus an absolute value of a difference between said input and output voltages plus a maximum one of zero and a difference between said input and output voltages beginning when transitioning to said second switching state, and then resets back to said first lower voltage in response to said first timing indication;
- a third ramp circuit that provides a third ramp voltage during said buck-boost regulation mode, wherein said third ramp voltage ramps down from said first upper voltage at a rate proportional to said output voltage plus an absolute value of a difference between said input and output voltages plus a maximum one of zero and a difference between said input and output voltages beginning when transitioning to said fourth switching state until said second timing indication is provided, and then resets back to said first upper voltage;
- a first comparator that provides said first timing indication when said second ramp voltage reaches said primary ramp voltage; and
- a second comparator that provides said second timing indication when said third ramp voltage reaches said primary ramp voltage.

10. The electronic device of claim 1, further comprising:
a second ramp circuit that provides a third ramp voltage during said buck-boost regulation mode, wherein while said input voltage is greater than said output voltage, said third ramp voltage ramps down from said first lower voltage at a rate proportional to said difference between said input and output voltages beginning when transitioning to said second switching state until said first timing indication is provided at which time said third ramp voltage is at a second lower voltage, wherein said third ramp voltage then remains at said second lower voltage until transitioning to said fourth switching state, and wherein while said input voltage is less than said output voltage, said third ramp voltage ramps up from said first upper voltage at a rate proportional to said difference between said input and output voltages beginning when transitioning to said fourth switching state until said second timing indication is provided at which time said third ramp voltage is at a second upper voltage, wherein said third ramp voltage then remains at said second upper voltage until transitioning to said second switching state;

wherein during said buck-boost regulation mode while said input voltage is greater than said output voltage, said switching controller instead transitions from said third switching state to said fourth switching state when said primary ramp voltage reaches said second ramp voltage, and during said buck-boost regulation mode while said input voltage is less than said output voltage, said switching controller instead transitions from said first switching state to said second switching state when said primary ramp voltage reaches said second ramp voltage; and wherein said timing circuit comprises:
- a third ramp circuit that provides a third ramp voltage during said buck-boost regulation mode, wherein said third ramp voltage ramps up from said first lower voltage at a rate proportional to a maximum one of said input and output voltages beginning when transitioning to said second switching state until said first timing indication is provided, wherein said third ramp voltage ramps down from said first upper voltage at a rate proportional to a maximum one of said input and output voltages in response to transitioning to said fourth switching state until said second timing indication is provided;
- a first comparator that provides said first timing indication when said third ramp voltage reaches said first upper voltage during said second switching state; and
- a second comparator that provides said second timing indication when said primary ramp voltage reaches said first lower voltage during said third switching state.

11. The electronic device of claim 1, wherein:
said buck-boost voltage converter comprises a first switch coupled between an input voltage and a first end of an output inductor, a second switch coupled between said first end of said output inductor and a reference node, a third switch coupled between an output voltage and a second end of said output inductor, and a fourth switch coupled between said second end of said output inductor and said reference node; and wherein said switching controller turns on said first and third switches and turns off said second and fourth switches in said first switching state, turns on said first and fourth switches and turns off said second and third switches in said second and fourth switching states, and turns on said second and fourth switches and turns off said first and third switches in said third switching state.

12. The electronic device of claim 1, wherein said primary ramp circuit comprises:
- a ramp capacitor developing said primary ramp voltage;
- a first switched current source that charges said ramp capacitor with a current proportional to said input voltage;
- a second switched current source that discharges said ramp capacitor with a current proportional to said output voltage;
- a first comparator that compares said primary ramp voltage with said first upper voltage and that provides a signal indicative thereof to said switching controller; and
- a second comparator that compares said primary ramp voltage with said first lower voltage and that provides a signal indicative thereof to said switching controller.

13. The electronic device of claim 1, wherein said timing circuit comprises at least one ramp circuit, each said ramp circuit comprising:
- a ramp capacitor developing a timing ramp voltage;
- at least one switched current source that either charges or discharges said ramp capacitor with a predetermined current;
- at least one voltage source that develops an offset voltage relative to said regulation control voltage; and
- at least one comparator that compares said timing ramp voltage with said offset voltage and that provides a selected one of said first and second timing indications.

14. The electronic device of claim 1, wherein said first and second voltage sources are adjusted to adjust said window voltage in order to control switching frequency towards a steady state frequency level.

15. The electronic device of claim 1, wherein said switching controller ensures that each of said switching states have a least a predetermined minimum period.

16. The electronic device of claim 1, further comprising a mode controller that selects one of said buck, boost and buck-boost regulation modes based on relative levels of said input and output voltages.

17. The electronic device of claim 1, further comprising a processor and peripheral system including a memory coupled to said hysteretic current mode buck-boost voltage regulator.

18. A method of converting an input voltage to an output voltage using hysteretic current mode control, comprising:
toggling a buck-boost voltage converter between first and second switching states in a boost regulation mode when the input voltage is less than the output voltage and toggling the buck-boost voltage converter between third and fourth switching states in a buck regulation mode when the input voltage is greater than the output voltage;
providing a window voltage including a first upper voltage above a regulation control voltage and a first lower voltage below the regulation control voltage;
developing a primary ramp signal that replicates current through an output inductor of the buck-boost voltage converter, in which the primary ramp voltage ramps up at a rate proportional to the input voltage in the first switching state, ramps down at a rate proportional to the output voltage in the third switching state, and ramps proportional to a difference between the input and output voltages in the second and fourth switching states;
during a buck-boost regulation mode when the input voltage is within a predetermined boundary of the output voltage, transitioning from the first switching state to the second switching state when the primary ramp voltage reaches the first upper voltage, transitioning from the second switching state to the third switching state in response to a first timing indication, transitioning from the third switching state to the fourth switching state when the primary ramp voltage reaches the first lower voltage, and transitioning from the fourth switching state to the first switching state in response to a second timing indication; and
providing the first and second timing indications to ensure that the second and fourth switching states have approximately the same duration during the buck-boost regulation mode.

19. The method of claim 18, further comprising:
increasing the first upper voltage by a positive offset voltage above a nominal level of the first upper voltage based on a difference between the input and output voltages and a nominal level of the window voltage when the input voltage is greater than the output voltage; and
decreasing the first lower voltage by a negative offset voltage below a nominal level of the first lower voltage based on a difference between the input and output voltages and the nominal level of the window voltage when the input voltage is greater than the output voltage.

20. The method of claim 18, further comprising adjusting the window voltage in order to control switching frequency towards a steady state frequency level.

21. The method of claim 18, further comprising preventing a period of each of the switching states from falling below a predetermined minimum period.

22. The method of claim 18, further comprising selecting between the buck, boost and buck-boost regulation modes based on relative levels of said input and output voltages.

23. The method of claim 18, wherein said providing the first and second timing indications comprises:
providing a second upper voltage above a nominal level of the first upper voltage by a nominal level of the window voltage;
providing a second lower voltage below a nominal level of the first lower voltage by the nominal level of the window voltage;
providing a second ramp voltage during the buck-boost regulation mode that ramps down from the second upper voltage at a rate proportional to the output voltage beginning when transitioning to the second switching state and then resetting the second ramp voltage back to the second upper voltage upon reaching the second lower voltage;
providing the first timing indication when the second ramp voltage reaches the primary ramp voltage; and
providing the second timing indication when the second ramp voltage reaches the second lower voltage.

24. The method of claim 18, wherein said providing the first and second timing indications comprises:
providing a second upper voltage above a nominal level of the first upper voltage by a nominal level of the window voltage;
providing a second ramp voltage during the buck-boost regulation mode that ramps down from the second upper voltage at a rate proportional to the output voltage beginning when transitioning to the second switching state until the first timing indication is provided, then holding the second ramp voltage at a steady voltage in response to the first timing indication, and then ramping the second ramp voltage up at a rate proportional to the output voltage in response to transitioning to the fourth switching state;
providing the first timing indication when the second ramp voltage reaches the primary ramp voltage; and
providing the second timing indication when the second ramp voltage reaches the second upper voltage.

25. The method of claim 18, wherein said providing the first and second timing indications comprises:
providing a second ramp voltage during the buck-boost regulation mode that ramps up from the first lower voltage at a rate proportional to the input voltage plus an absolute value of a difference between the input and output voltages plus a maximum one of zero and a difference between the input and output voltages beginning when transitioning to the second switching state until the first timing indication is provided, and then that goes to the first upper voltage, and that ramps down from the first upper voltage at a rate proportional to the output voltage plus an absolute value of a difference between the input and output voltages plus a maximum one of zero and a difference between the input and output voltages in response to transitioning to the fourth switching state until the second timing indication is provided, and then that goes to the first lower voltage;
providing the first timing indication when the second ramp voltage reaches the primary ramp voltage while the second ramp voltage is ramping up; and
providing the second timing indication when the second ramp voltage reaches the primary ramp voltage while the second ramp voltage is ramping down.

26. The method of claim 18, wherein said providing the first and second timing indications comprises:
- providing the nominal levels of the first upper and lower voltages;
- providing a second ramp voltage during the buck-boost regulation mode that ramps up from the nominal level of the first lower voltage at a rate proportional to a maximum one of the input and output voltages beginning when transitioning to the second switching state until the first timing indication is provided, that ramps up at a rate proportional to a maximum one of the input and output voltages in response to transitioning to the fourth switching state, and resetting the second ramp voltage back to the first lower voltage in response to each of the first and second timing indications;
- providing the first timing indication when the second ramp voltage reaches the nominal level of the first upper voltage during the second switching state; and
- providing the second timing indication when the second ramp voltage reaches the nominal level of the first upper voltage during the fourth switching state.

27. The method of claim 18, wherein said providing the first and second timing indications comprises:
- providing the nominal levels of the first upper and lower voltages;
- providing a second ramp voltage during the buck-boost regulation mode that ramps up from the nominal level of the first lower voltage at a rate proportional to a maximum one of the input and output voltages beginning when transitioning to the second switching state until the first timing indication is provided, that ramps down at a rate proportional to a maximum one of the input and output voltages in response to transitioning to the fourth switching state until the second timing indication is provided, keeping the second ramp voltage at the nominal level of the first upper voltage in response to the first timing indication, and keeping the second ramp voltage at the nominal level of said first lower voltage in response to the second timing indication;
- providing the first timing indication when the second ramp voltage reaches the nominal level of the first upper voltage; and
- providing the second timing indication when the second ramp voltage reaches the nominal level of said the lower voltage.

28. The method of claim 18, wherein said providing the first and second timing indications comprises:
- providing a second upper voltage above a nominal level of the first upper voltage by a nominal level of the window voltage;
- providing a second lower voltage below a nominal level of the first lower voltage by the nominal level of the window voltage;
- providing a second ramp voltage during the buck-boost regulation mode that repeatedly ramps up from the second lower voltage to the second upper level at a rate proportional to the input voltage and ramps down from the second upper level to the second lower level at a rate proportional to the output voltage;
- providing the first timing indication when the second ramp voltage reaches the primary ramp voltage when ramping down from the second upper level; and
- providing the second timing indication when the second ramp voltage reaches the primary ramp voltage when ramping up from the second lower level.

29. The method of claim 18, wherein said providing the first and second timing indications comprises:
- providing a second upper voltage above a nominal level of the first upper voltage by a nominal level of the window voltage;
- providing a second lower voltage below a nominal level of the first lower voltage by the nominal level of the window voltage;
- providing a second ramp voltage during the buck-boost regulation mode that ramps down from the second upper voltage at a rate proportional to the output voltage beginning when transitioning to the second switching state, and that resets back to the second upper voltage in response to the first timing indication;
- providing a third ramp voltage during the buck-boost regulation mode that ramps up from the second lower voltage at a rate proportional to the input voltage beginning when transitioning to the fourth switching state, and that resets back to the second lower voltage in response to the second timing indication;
- providing the first timing indication when the second ramp voltage reaches the primary ramp voltage; and
- providing the second timing indication when the third ramp voltage reaches the primary ramp voltage.

30. The method of claim 18, wherein said providing the first and second timing indications comprises:
- providing a second ramp voltage during the buck-boost regulation mode that ramps up from the first lower voltage at a rate proportional to the input voltage plus an absolute value of a difference between the input and output voltages plus a maximum one of zero and a difference between the input and output voltages beginning when transitioning to the second switching state, and then that resets back to the first lower voltage in response to the first timing indication;
- providing a third ramp voltage during the buck-boost regulation mode that ramps down from the first upper voltage at a rate proportional to the output voltage plus an absolute value of a difference between the input and output voltages plus a maximum one of zero and a difference between the input and output voltages beginning when transitioning to the fourth switching state until the second timing indication is provided, and then that resets back to the first upper voltage;
- providing the first timing indication when the second ramp voltage reaches the primary ramp voltage; and
- providing the second timing indication when the third ramp voltage reaches the primary ramp voltage.

* * * * *

UNITED STATES PATENT AND TRADEMARK OFFICE
CERTIFICATE OF CORRECTION

PATENT NO. : 9,614,380 B2  
APPLICATION NO. : 14/872349  
DATED : April 4, 2017  
INVENTOR(S) : Houston et al.

It is certified that error appears in the above-identified patent and that said Letters Patent is hereby corrected as shown below:

In the Specification

Column 2, Line 60, delete "first transistor Q4" and insert -- first transistor Q3 --, therefor.

Column 2, Line 62, delete "second transistor Q3" and insert -- second transistor Q4 --, therefor.

Column 3, Lines 17-18, delete "P-type FET (PFET)" and insert -- N-type FET (NFET) --, therefor.

Column 4, Line 26, delete ""X"" and insert -- "X" is --, therefor.

Column 4, Line 37, delete "third switching state" and insert -- third switching state S2 --, therefor.

Column 4, Lines 41-42, delete "fourth switching state" and insert -- fourth switching state S3 --, therefor.

Column 5, Line 50, delete "comparator C3" and insert -- comparator 425 --, therefor.

Column 6, Lines 51-52, delete "ramp capacitor CR1" and insert -- capacitance CR1 --, therefor.

Column 7, Line 1, delete "ramp capacitor CR1" and insert -- capacitance CR1 --, therefor.

Column 7, Line 26, delete "voltage window" and insert -- window voltage --, therefor.

Column 7, Line 58, delete "switching frequency" and insert -- frequency --, therefor.

Column 8, Line 39, delete "current sources 433" and insert -- current sources 431 --, therefor.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,614,380 B2

Column 9, Line 2, delete "develops" and insert -- develop --, therefor.

Column 11, Line 22, delete "S0 the" and insert -- S0, the --, therefor.

Column 11, Line 29, delete "S1 the" and insert -- S1, the --, therefor.

Column 12, Line 53, delete "control signal VC." and insert -- control voltage VC. --, therefor.

Column 18, Line 51, delete "VWM." and insert -- VWN. --, therefor.

Column 20, Line 24, delete "VR1<VWM" and insert -- VR1<VWN --, therefor.

Column 23, Lines 25-26, delete "current source 433" and insert -- current source 435 --, therefor.

Column 23, Line 46, delete "12" and insert -- I2 --, therefor.

Column 24, Line 9, delete "state S1" and insert -- state S1, --, therefor.

Column 25, Line 20, delete "current source 453" and insert -- current source 456 --, therefor.

Column 25, Line 48, delete "(control signal S4)," and insert -- (control signal C4), --, therefor.

In the Claims

Column 35, Line 3, Claim 15, delete "a least" and insert -- at least --, therefor.

Column 37, Line 45, Claim 27, delete "said the" and insert -- said --, therefor.